United States Patent
Kolze et al.

(10) Patent No.: US 12,537,726 B2
(45) Date of Patent: Jan. 27, 2026

(54) BOOST METRIC BASED PRE-EQ LIMITING SYSTEMS AND METHODS

(71) Applicant: AVAGO TECHNOLOGIES INTERNATIONAL SALES PTE. LIMITED, Singapore (SG)

(72) Inventors: Thomas J. Kolze, Phoenix, AZ (US); Roger Fish, Superior, CO (US)

(73) Assignee: Avago Technologies International Sales Pte. Limited, Singapore (SG)

(*) Notice: Subject to any disclaimer, the term of this patent is extended or adjusted under 35 U.S.C. 154(b) by 141 days.

(21) Appl. No.: 18/498,565

(22) Filed: Oct. 31, 2023

(65) Prior Publication Data

US 2024/0275647 A1    Aug. 15, 2024

Related U.S. Application Data

(60) Provisional application No. 63/445,290, filed on Feb. 13, 2023, provisional application No. 63/444,879, filed on Feb. 10, 2023.

(51) Int. Cl.
*H04L 25/03* (2006.01)
*H04L 12/28* (2006.01)

(52) U.S. Cl.
CPC .... *H04L 25/03878* (2013.01); *H04L 12/2801* (2013.01)

(58) Field of Classification Search
CPC ... H04L 25/02; H04L 25/03; H04L 25/03878; H04L 25/03885; H04L 12/28; H04L 12/2801; H04L 27/26; H04L 27/2601; H04L 27/2614; H04W 52/04; H04W 52/06; H04W 52/16; H04W 52/08; H04W 52/22; H04W 52/221–228
See application file for complete search history.

(56) References Cited

U.S. PATENT DOCUMENTS

| | | | |
|---|---|---|---|
| 7,020,482 B2 * | 3/2006 | Medvedev | H04W 52/346 455/69 |
| 9,264,144 B2 * | 2/2016 | Yu | H04L 27/18 |
| 9,461,738 B2 * | 10/2016 | Rahman | H04L 27/2613 |

(Continued)

OTHER PUBLICATIONS

"Data-Over-Cable Service Interface Specifications DOCSIS", ITU-T Draft; Study Period 2017-2020, Study Group 9, International Telecommunication Union, Geneva, CH, May 6, 2019 (May 6, 2019), pp. 1-296.

(Continued)

*Primary Examiner* — James M Perez
(74) *Attorney, Agent, or Firm* — Foley & Lardner LLP

(57) ABSTRACT

Boost is provided. A circuit of a cable modem can be configured to receive, at a first input, a first message from a device over a channel, the channel comprising various subcarriers. The circuit can determine a transfer function associated with each of the subcarriers, the transfer function including an indication of power transfer between the circuit and the device. The circuit can determine, using the transfer functions, a power adjustments corresponding to the subcarriers. The circuit can determine, using the power adjustments, another power adjustment for the channel. The circuit can transmit, at a first output, a second message over the channel, the transmit power of the second message responsive to each of the power adjustments.

24 Claims, 14 Drawing Sheets

(56) References Cited

U.S. PATENT DOCUMENTS

| | | | | |
|---|---|---|---|---|
| 9,497,053 | B2* | 11/2016 | Zhang | H04L 5/0051 |
| 9,692,624 | B2* | 6/2017 | Kolze | H04L 1/0003 |
| 9,906,325 | B2* | 2/2018 | Ohana | H04L 27/2602 |
| 9,929,853 | B2* | 3/2018 | Kolze | H04L 12/2801 |
| 10,009,191 | B2* | 6/2018 | Currivan | H04L 27/26134 |
| 10,020,974 | B2* | 7/2018 | Zhang | H04B 10/27 |
| 10,574,426 | B2* | 2/2020 | Kolze | H04L 41/0853 |
| 11,863,359 | B1* | 1/2024 | Arool Emmanuel | H04L 27/2627 |
| 12,206,557 | B2* | 1/2025 | Bush | H04L 41/16 |
| 2002/0060990 | A1* | 5/2002 | Bohnke | H04L 27/2626 370/482 |
| 2004/0127245 | A1* | 7/2004 | Sadri | H04L 27/2601 455/517 |
| 2004/0192218 | A1* | 9/2004 | Oprea | H04L 25/03343 455/73 |
| 2005/0018702 | A1* | 1/2005 | Chen | H04L 5/0044 370/431 |
| 2005/0031047 | A1* | 2/2005 | Maltsev | H04L 1/0009 375/267 |
| 2005/0078759 | A1* | 4/2005 | Zhang | H04L 5/023 375/260 |
| 2005/0232336 | A1* | 10/2005 | Balakrishnan | H04L 25/03343 375/130 |
| 2005/0249304 | A1* | 11/2005 | Takano | H04B 7/0613 375/267 |
| 2006/0078059 | A1* | 4/2006 | Ok | H04L 5/0044 375/260 |
| 2006/0227889 | A1* | 10/2006 | Uchida | H04W 52/42 375/347 |
| 2006/0234751 | A1* | 10/2006 | Horng | H04B 7/04 455/522 |
| 2006/0276215 | A1* | 12/2006 | Lozano | H04W 52/346 455/69 |
| 2007/0002772 | A1* | 1/2007 | Berkman | H04L 12/28 370/257 |
| 2007/0041464 | A1* | 2/2007 | Kim | H04L 1/20 375/267 |
| 2007/0121744 | A1* | 5/2007 | Zuckerman | H04L 27/2601 375/260 |
| 2007/0253476 | A1* | 11/2007 | Tirkkonen | H04L 25/03159 375/230 |
| 2014/0254697 | A1* | 9/2014 | Zhang | H04L 5/0094 375/260 |
| 2015/0110492 | A1* | 4/2015 | Yu | H04L 27/362 398/79 |
| 2015/0296057 | A1* | 10/2015 | Ohana | H04L 69/323 370/437 |
| 2016/0219506 | A1* | 7/2016 | Pratt | H04W 40/16 |
| 2016/0359547 | A1* | 12/2016 | Bennett | H04B 7/15507 |
| 2017/0019283 | A1* | 1/2017 | Zhang | H04L 5/0094 |
| 2018/0234275 | A1* | 8/2018 | Miller | H04B 3/02 |
| 2018/0270143 | A1* | 9/2018 | Currivan | H04L 25/022 |
| 2018/0287660 | A1* | 10/2018 | Arambepola | H04L 12/2801 |
| 2018/0316535 | A1* | 11/2018 | Zhang | H04L 12/2801 |
| 2019/0068353 | A1* | 2/2019 | Kolze | H04L 5/14 |
| 2019/0075013 | A1* | 3/2019 | Garcia | H04L 12/44 |
| 2021/0075520 | A1* | 3/2021 | Soto | H04L 12/10 |
| 2021/0289445 | A1* | 9/2021 | Muruganathan | H04W 52/146 |
| 2022/0109612 | A1* | 4/2022 | Bush | H04L 43/55 |
| 2023/0090396 | A1* | 3/2023 | Thompson | H04L 41/082 375/257 |
| 2024/0106696 | A1* | 3/2024 | Ovadia | H04L 25/0212 |
| 2024/0275647 | A1* | 8/2024 | Kolze | H04L 25/03878 |
| 2025/0132986 | A1* | 4/2025 | Bush | H04L 41/0631 |

OTHER PUBLICATIONS

Extended European Search Report on EP 24156611 mailed Jul. 9, 2024 (9 pages.).

Keller T et al: "Sub-band adaptive pre-equalised OFDM transmission", VTC 1999—Fall. IEEE VTS 50th. Vehicular Technology Conference. Gateway to the 21st. Century Communications Village. Amsterdam, Sep. 19-22, 1999; [IEEE Vehicular Technolgy Conference ], New York, NY : IEEE, US, vol. 1, Sep. 19, 1999 (Sep. 19, 1999), pp. 334-338.

* cited by examiner

BOOST METRIC BASED PRE-EQ LIMITING SYSTEMS AND METHODS

CROSS-REFERENCE TO RELATED APPLICATIONS

This disclosure claims priority to U.S. Provisional Patent Application No. 63/445,290 filed Feb. 13, 2023, and to U.S. Provisional Patent Application No. 63/444,879 filed Feb. 10, 2023, both of which are incorporated herein by reference in their entireties for all purposes.

FIELD OF THE DISCLOSURE

This disclosure generally relates to systems for and methods of communication over a channel link with per-subcarrier equalization.

BACKGROUND OF THE DISCLOSURE

In the last few decades, the bandwidth for wireless communications devices has grown by orders of magnitude, fueled by the use of portable devices, and increased connectivity and data transfer between all manners of devices. Physical infrastructure has not grown commensurate with the demand for data transfer between the various device. Thus, multiple channels or multiple subcarriers can exchange information across a physical layer connection to achieve data transfer rates. Wired communication can operate in accordance with various standards such as data over cable service interface specification (DOCSIS) 4.0, 3.1, 3.0, etc. As higher data throughput and other changes develop, newer standards are constantly being developed for adoption, such as a progression from DOCSIS to 1.0 to 4.0.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

Figure 1A:
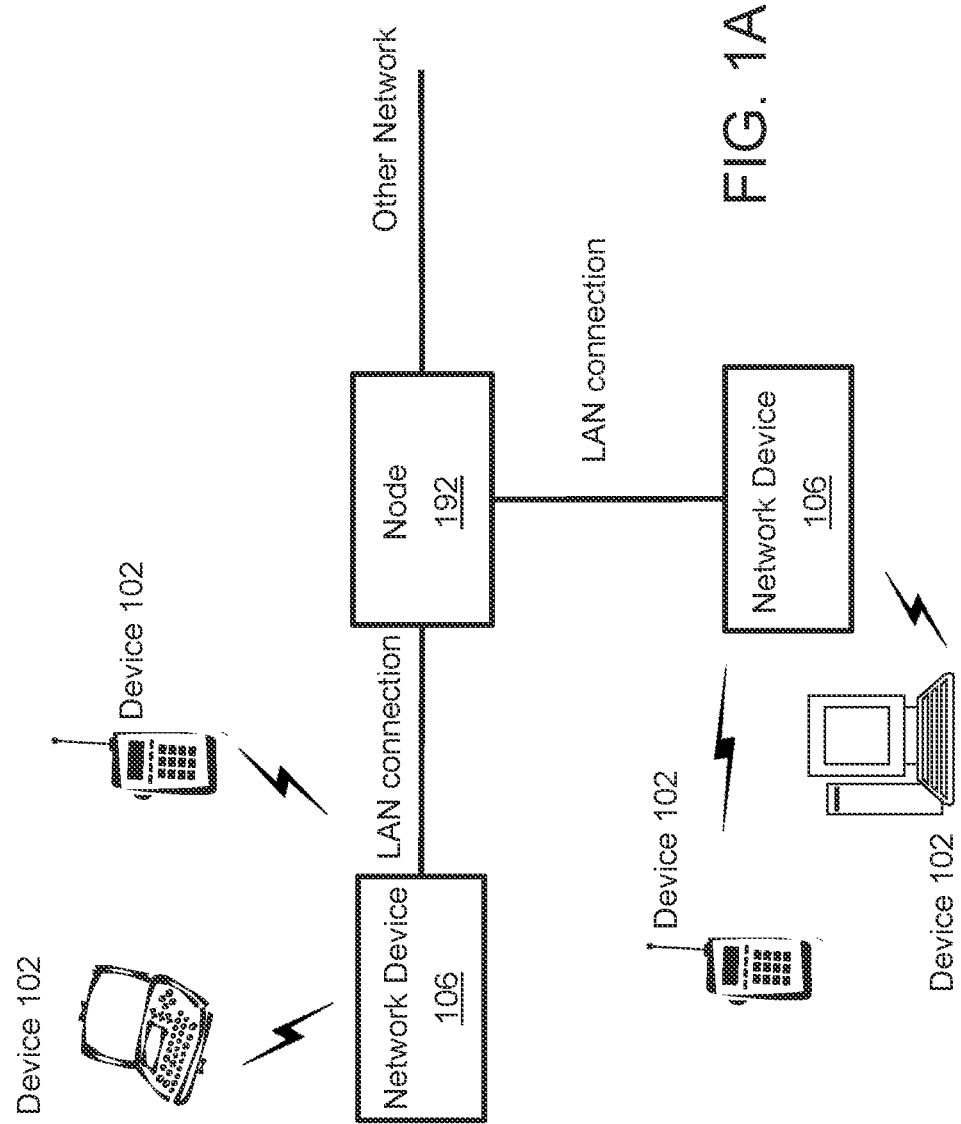
FIG. 1A is a block diagram depicting a network environment including one or more access points in communication with one or more devices or stations, according to some embodiments.

The details of various embodiments of the methods and systems are set forth in the accompanying drawings and the description below.

SUMMARY

Boost is provided. A circuit of a cable modem can be configured to receive, at a first input, a first message from a device over a channel, the channel comprising various subcarriers. The circuit can determine a transfer function associated with each of the subcarriers, the transfer function including an indication of power transfer between the circuit and the device. The circuit can determine, using the transfer functions, a power adjustments corresponding to the subcarriers. The circuit can determine, using the power adjustments, another power adjustment for the channel. The circuit can transmit, at a first output, a second message over the channel, the transmit power of the second message responsive to each of the power adjustments. The amount of the increase in transmit power for a device such as a cable modem in an HFC plant (or any amplifier practicing pre-equalization), due to a non-flat channel frequency response which will employ pre-equalization, is provided. This value can be used in many beneficial ways to improve performance for the cable modem (or other device) in the system in the presence of the non-flat channel impairment. Systems can methods cam limit the amount of pre-equalization increase of transmit power in subcarriers in an OFDMA modulation scheme, to further benefit the overall performance of the cable modem (or other device).

Various embodiments disclosed herein are related to a system. The system can include a circuit configured to receive, at a first input, a first message from a device over a channel, the channel including multiple subcarriers. The circuit can be configured to determine a transfer function associated with each of the plurality of subcarriers, the transfer function including an indication of power transfer between the circuit and the device. The circuit can be configured to determine, using the transfer functions, first power adjustments corresponding to each of the subcarriers. The circuit can be configured to determine, using the first power adjustments, a second power adjustment for the channel. The circuit can be configured to transmit, at a first output, a second message over the channel, the transmit power of the second message responsive to the first power adjustments and the second power adjustment. The system operation can correspond to a ranging process or other establishment or maintenance of a communicative link (e.g., between a cable modem and a cable modem termination service which can be configured to communicate according to a DOCSIS or related protocol).

In some embodiments, the first power adjustments are configured to cause a receipt, at the device, of an equal power level for each subcarrier of the plurality of subcarriers. The second power adjustment can be configured to provide a channel power equal to a predefined power level.

In some embodiments, the first message is a probe response, the probe response generated responsive to an output of the circuit comprising a probe.

In some embodiments, the second power adjustment is based on a summation of an indication of a received amplitude for each of the plurality of subcarriers divided by a quantity of the plurality of subcarriers, the indication of the received amplitude based on a square of a ratio of a largest transfer function to each transfer function.

In some embodiments, the circuit is configured to compare a predefined threshold to the indication of the received amplitude to determine a quantity of subcarriers of the subcarriers exceeding the predefined threshold. The circuit can determine a second threshold which is equal to a scaled predefined threshold. The scaling can be according to a ratio of the quantity of the plurality of subcarriers to the quantity of subcarriers of the plurality of subcarriers exceeding the predefined threshold. The first power adjustments, for the subcarriers exceeding the predefined threshold, can be based on the second threshold.

In some embodiments, the circuit is configured to identify a first set of a second plurality of subcarriers as excludable. The circuit can identify a second set of the second plurality of subcarriers as non-excludable, wherein the plurality of subcarriers consist of the second set.

In some embodiments, each transfer function includes a scalar indicating a subcarrier power, normalized relative to other subcarriers of the plurality of subcarriers.

In some embodiments, the system is configured to generate a notification indicating a condition of the channel for presentation via a user interface.

In some embodiments, the system includes a cable modem, the cable modem comprising the circuit.

In some embodiments, the second power adjustment is determined responsive to a power adjustment command received from a broadband access server (BAS).

In some embodiments, the second power adjustment varies from a current power adjustment received from a cable modem termination service (CMTS).

In some embodiments, the system determines a portion of the second power adjustment according to a predefined offset. The system can determine a set of subcarriers of the plurality of subcarriers having a power level corresponding to the portion and exclude the set of subcarriers.

In some embodiments, the plurality of first power adjustments are configured to normalize a receipt, at the device, of a power level for each subcarrier of the plurality of subcarriers corresponding to a non-equal equal power level, the power level tilting monotonically over frequency.

In some embodiments, the determination of the plurality of first power adjustments or the second power adjustment is determined based on communication with a second device, the second device operatively connected to a plurality instances of the circuit. Two or more of the plurality instances of the circuit can be arranged in a cascade between a cable modem and a CMTS. The second device can determine the adjustments based on signals received by the plurality of instances of the circuit. The instances of the circuit can include the cable modem, the CMTS, or a smart amplifier disposed between the cable modem and the CMTS, or a duplex amplifier disposed between the cable modem and the CMTS.

Various embodiments disclosed herein are related to a method. The method can include receiving, by a first device, a first message from a second device over a channel, the channel including multiple subcarriers. The method can include determining, by the first device, a transfer function associated with each of the subcarriers, the transfer function comprising an indication of power transfer between the first device and the second device. The method can include determining, using the transfer functions, first power adjustments corresponding to respective subcarriers. The method can include determining, using the plurality of first power adjustments, a second power adjustment for the channel, the second power adjustment based on a summation of an indication of a received amplitude for each of the plurality of subcarriers divided by a quantity of the plurality of subcarriers, the indication of the received amplitude based on a square of a ratio of a largest transfer function to each transfer function. The method can include transmitting, by the first device, a second message over the channel, the transmit power of the second message responsive to the plurality of first power adjustments and the second power adjustment.

In some embodiments, the first power adjustments are configured to reduce a power level deviation between two or more of the subcarriers. The second power adjustment can be configured to provide a channel power equal to a predefined power level. For example, in some embodiments, the predefined power level is for the portion of the subcarriers which do not have their power levels reduced in the first power adjustments.

In some embodiments, the first message is a probe response.

In some embodiments, the method includes comparing a predefined threshold to the indication of the received amplitude to determine a quantity of subcarriers of the plurality of subcarriers exceeding the predefined threshold. The method can include determining a second threshold which is equal to a scaled instance of the predefined threshold. The scaling can be according to the quantity of the plurality of subcarriers to the quantity of subcarriers of the plurality of subcarriers exceeding the predefined threshold. The first power adjustments, for the subcarriers of the subcarriers exceeding the predefined threshold, can be based on the second threshold.

In some embodiments, the method includes generating a notification indicating a condition of the channel for presentation via a user interface.

Various embodiments disclosed herein are related to a device. The device can be configured to receive a first message from a second device over a channel, the channel comprising a plurality of subcarriers. The device can determine a transfer function associated with each of the subcarriers, the transfer function including an indication of power transfer with the second device. The device can determine, using the transfer functions, first power adjustments corresponding to the plurality of subcarriers. The device can determine, using the first power adjustments, a second power adjustment for the channel, based on a summation of an indication of a received amplitude for each of the plurality of subcarriers divided by a quantity of the plurality of subcarriers, the indication of the received amplitude based on a square of a ratio of a largest transfer function to each transfer function. The device can transmit a second message over the channel, the transmit power of the second message responsive to the plurality of first power adjustments and the second power adjustment.

In some embodiments, the first power adjustments are configured to cause a receipt, at the second device, of an equal power level for each subcarrier of the plurality of subcarriers. The second power adjustment can be configured to provide a channel power equal to a predefined power level.

In some embodiments, the device is configured to compare a predefined threshold to the indication of the received amplitude to determine a quantity of subcarriers exceeding the predefined threshold. The device can be configured to determine a second threshold which is equal to the predefined threshold, scaled. The scaling can be according to a ratio of the quantity of the subcarriers to the quantity of subcarriers of the plurality of subcarriers exceeding the predefined threshold. The first power adjustments, for the subcarriers exceeding the predefined threshold, can be based on the second threshold.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, a first feature in communication with or communicatively coupled to a second feature in the description that follows may include embodiments in which the first feature is in direct communication with or directly coupled to the second feature and may also include embodiments in which additional features may intervene between the first and second features, such that the first feature is in indirect communication with or indirectly coupled to the second feature. In addition, the present disclosure may repeat reference numerals and/or letters in the various examples. This repetition is for the purpose of simplicity and clarity and does not in itself dictate a relationship between the various embodiments and/or configurations discussed.

The following standard(s), including any draft versions of such standard(s) and draft amendments to such standards, are hereby incorporated herein by reference in their entirety and are made part of the present disclosure for all purposes: CableLabs® DOCSIS 3.0, 3.1, and 4.0 standards, including MULP 3.1 and 4.0 and PHY standards 3.1 and 4.0, further including CM-SP-CCAP-OSSI and CM-SP-CM-OSSI, for v. 3.1 and 4.0, CM-SP-R-PHY; and Society of Cable Telecommunications Engineers (SCTE) 283 2023. Although this disclosure can reference aspects of these standard(s), the disclosure is in no way limited by these standard(s).

An impairment can create a large variation in frequency response across an orthogonal frequency division multiple-access (OFDMA) or other channel, such as an attenuation or amplification of one or more subcarriers of a channel. A small change in commanded cable modem transmit (Tx) power in the first probe response after the impairment occurs, can result from a pre-equalization vector (e.g., a small increase in Tx power responsive to a detected attenuation). A large variation in the pre-equalized vector may be present, wherein the pre-equalized vector includes adjustments to a power level for various subcarriers of the channel. In a channel using pre-equalization but with modulation such as single-carrier quadrature amplitude modulation (SC-QAM), systems and methods of the present disclosure may be practiced by forming the frequency-domain equivalent of the tapped delay line pre-equalizer of the SC-QAM transmitter, and operating the systems or methods on the frequency-domain pre-equalizer.

The cable modem can normalize the pre-equalization vector (e.g., to or towards unity per subcarrier across the channel) and transmit a signal according to the pre-equalization vector. At the burst upstream receiver (e.g., the cable modem termination system (CMTS)), the received signal may be much lower power than a target power spectral density (PSD), because a large portion of available Tx power is pushed into the highly attenuated subcarriers. This can result in the response to a second probe including a large commanded increase in cable modem Tx power in the impaired channel. Consequently, the cable modem may be limited by its own max Tx PSD and may not respond to the command. Even where a cable modem is not so limited, other channels may be operating below the top of the Dynamic Range Window and as such have no or limited fidelity requirements (e.g., no Tx modulation error rate (MER) requirement) and the received signal quality may be degraded for the other channels. This may perceptibly reduce system throughput, increase latency, etc. Further, after the first probe response, due to the small average power (below target PSD), the upstream channel may include errors.

The cable modem can calculate the increase in cable modem Tx power after one or more messages (e.g., one or more probes). A cable modem may include an interface with an analytic system (e.g., BAS) which comprises a network connected to the cable modem and at least one further device. The BAS can store, receive, or supply data present at any node such as any cable modem or CMTS. The cable modem can employ the teachings herein to limit the variations of the pre-equalization vector. This can limit the amount of transmit power increased by the cable modem in the impaired channel, which may reduce or eliminate degradation in other upstream channels. Further, the cable modem (or the BAS or CMTS) can determine an increase to transmission power along with (e.g., in a same message as) an increase in message transmission power. That is, the increase in transmission power can obviate a commanded message.

A BAS-connected CMTS can adjust a profile, such as a profile associated with a physical media attachment layer (PMA) for the impaired channel for the cable modem, based on the expectation of changed subcarrier power on an impacted link/subcarriers. Indeed, the operations disclosed herein may be performed at various locations. In some embodiments, the operations can be performed locally at a cable modem, wherein an indication of the operations can be conveyed to the BAS or CMTS. In some embodiments, the operations can be performed at the BAS or CMTS based on information received from the cable modem. In some embodiments, operations can be performed in remote PHY devices, in nodes, or in amplifiers or smart amplifiers (e.g., amplifiers or splitters configured to perform link equalization or adjust power levels, according to SCTE 283 2023 or an associated operation or protocol).

In some embodiments, the pre-equalization values can be limited to a predetermined size, such as due to a word format limitation, in either the pre-equalization update or in the applied pre-equalization values themselves (e.g., by the cable modem or the CMTS).

In many embodiments, a limit is not predetermined, and is dynamic based on a state of a cable network including a state of a cable modem thereof.

In some embodiments, a pre-equalization limit is applied to a prepared (e.g., normalized) pre-equalization vector, and then after such an application, another normalization is employed based on a change to a unity average. For example, such a normalization may be employed to maintain adherence to a standards specification (e.g., a DOCSIS specification).

A pre-equalization vector can be combined with a power adjustment to determine transmission parameters for a signal. Systems and methods of the present disclosure can apply a limited pre-equalization vector, with a limit amount which is variable and determined based on input parameters and the initial pre-equalization. Systems and methods of the present disclosure can generate a limit value based, in part, on a Tx power increase in the impaired channel/link/subcarrier. This differs from the inflexible limiting approaches employing fixed values.

By controlling the pre-equalization vector as described, and thus controlling the increase in the cable modem Tx channel power for that channel, degradation of other channels, subcarriers, or other links may be reduced.

For purposes of reading the description of the various embodiments below, the following descriptions of the sections of the specification and their respective contents can be helpful:

Section A describes a network environment and computing environment which can be useful for practicing embodiments described herein; and Section B describes embodiments of control link protocols and methods and devices using such protocols and methods.

A. Computing and Network Environment

Prior to discussing specific embodiments of the present solution, it can be helpful to describe aspects of the operating environment as well as associated system components (e.g., hardware elements) in connection with the methods and systems described herein. Referring to FIG. 1A, an embodiment of a network environment is depicted. In brief overview, the network environment includes a wireless communication system that includes one or more access points (APs) or network devices 106, one or more client devices (e.g., STAs) or wireless communication devices 102 and a network hardware component or network hardware 192. The wireless communication devices 102 can for example include laptop computers, tablets, personal computers, and/or cellular telephone devices. The details of an embodiment of each station or wireless communication device 102 and AP or network device 106 are described in greater detail with reference to FIGS. 1B and 1C. The network environment can be an ad hoc network environment, an infrastructure wireless network environment, a subnet environment, etc. in one embodiment. The network devices 106 or APs can be operably coupled to the network hardware 192 via local area network connections. Network devices 106 are 5G base stations in some embodiments. The network hardware 192, which can include a router, gateway, switch, bridge, modem, system controller, appliance, etc., can provide a local area network connection for the communication system. Each of the network devices 106 or APs can have an associated antenna or an antenna array to communicate with the wireless communication devices in its area. The wireless communication devices 102 can register with a particular network device 106 or AP to receive services from the communication system (e.g., via a SU-MIMO or MU-MIMO configuration). For direct connections (e.g., point-to-point communications), some wireless communication devices can communicate directly via an allocated channel and communications protocol. Some of the wireless communication devices 102 can be mobile or relatively static with respect to network device 106 or AP.

In some embodiments, a network device 106 or AP includes a device or module (including a combination of hardware and software) that allows wireless communication devices 102 to connect to a wired network using wireless fidelity (WiFi), or other standards. A network device 106 or AP can sometimes be referred to as a wireless access point (WAP). A network device 106 or AP can be implemented (e.g., configured, designed and/or built) for operating in a wireless local area network (WLAN). A network device 106 or AP can connect to a router (e.g., via a wired network) as a standalone device in some embodiments. In other embodiments, network device 106 or AP can be a component of a router. Network device 106 or AP can provide multiple devices access to a network. Network device 106 or AP can, for example, connect to a wired Ethernet connection and provide wireless connections using radio frequency links for other devices 102 to utilize that wired connection. A network device 106 or AP can be implemented to support a standard for sending and receiving data using one or more radio frequencies. Those standards, and the frequencies they use can be defined by the IEEE (e.g., IEEE 802.11 standards). A network device 106 or AP can be configured and/or used to support public Internet hotspots, and/or on a network to extend the network's Wi-Fi signal range.

In some embodiments, the access points or network devices 106 can be used for (e.g., in-home, in-vehicle, or in-building) wireless networks (e.g., IEEE 802.11, Bluetooth, ZigBee, any other type of radio frequency-based network protocol and/or variations thereof). Each of the wireless communication devices 102 can include a built-in radio and/or is coupled to a radio. Such wireless communication devices 102 and/or access points or network devices 106 can operate in accordance with the various aspects of the disclosure as presented herein to enhance performance, reduce costs and/or size, and/or enhance broadband applications. Each wireless communication device 102 can have the capacity to function as a client node seeking access to resources (e.g., data, and connection to networked nodes such as servers) via one or more access points or network devices 106.

The network connections can include any type and/or form of network and can include any of the following: a point-to-point network, a broadcast network, a telecommunications network, a data communication network, a computer network. The topology of the network can be a bus, star, or ring network topology. The network can be of any such network topology as known to those ordinarily skilled in the art capable of supporting the operations described herein. In some embodiments, different types of data can be transmitted via different protocols. In other embodiments, the same types of data can be transmitted via different protocols.

Figure 1B:
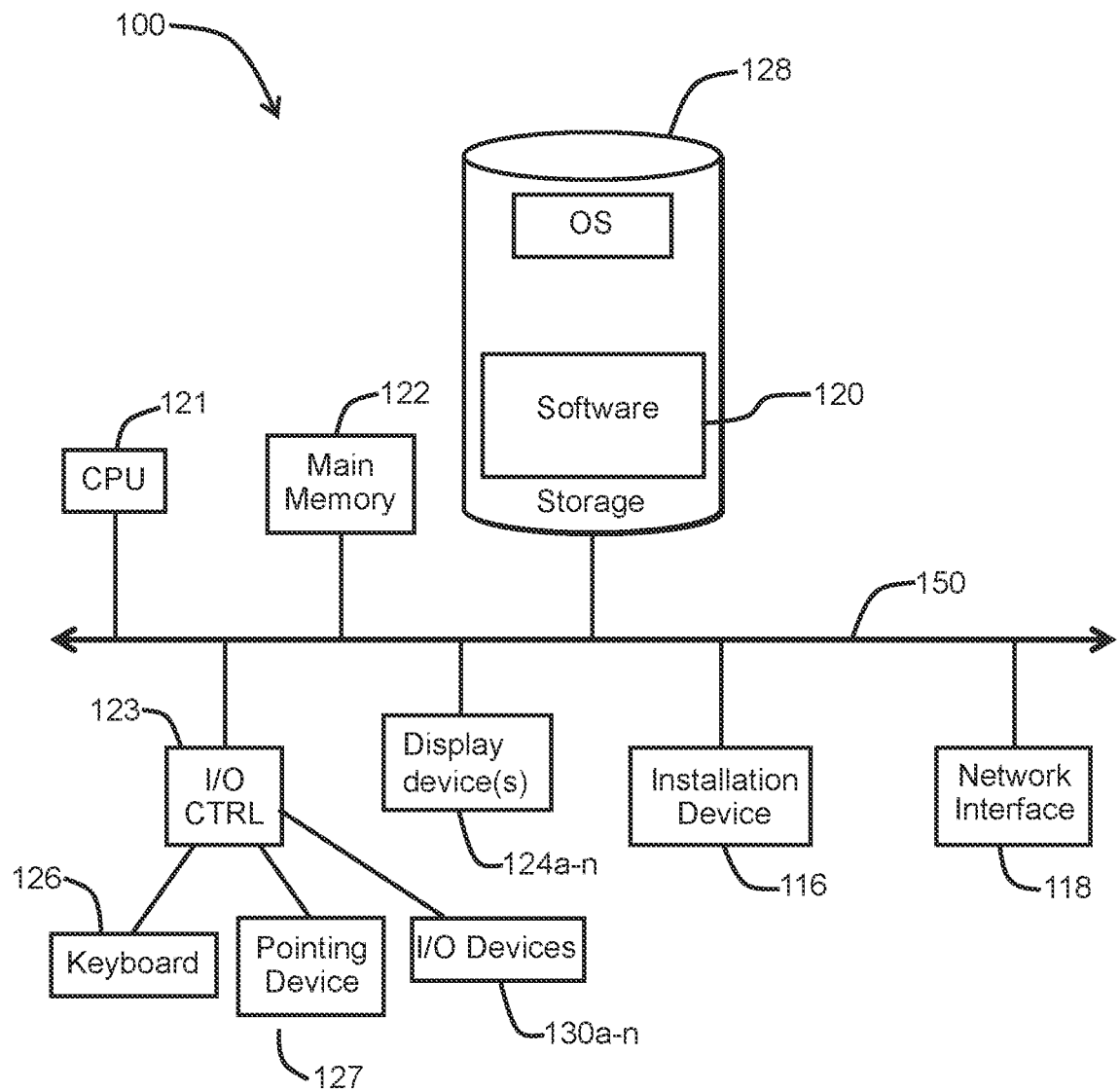
FIGS. 1B and 1C are block diagrams depicting computing devices useful in connection with the methods and systems described herein, according to some embodiments.
Figure 1C:
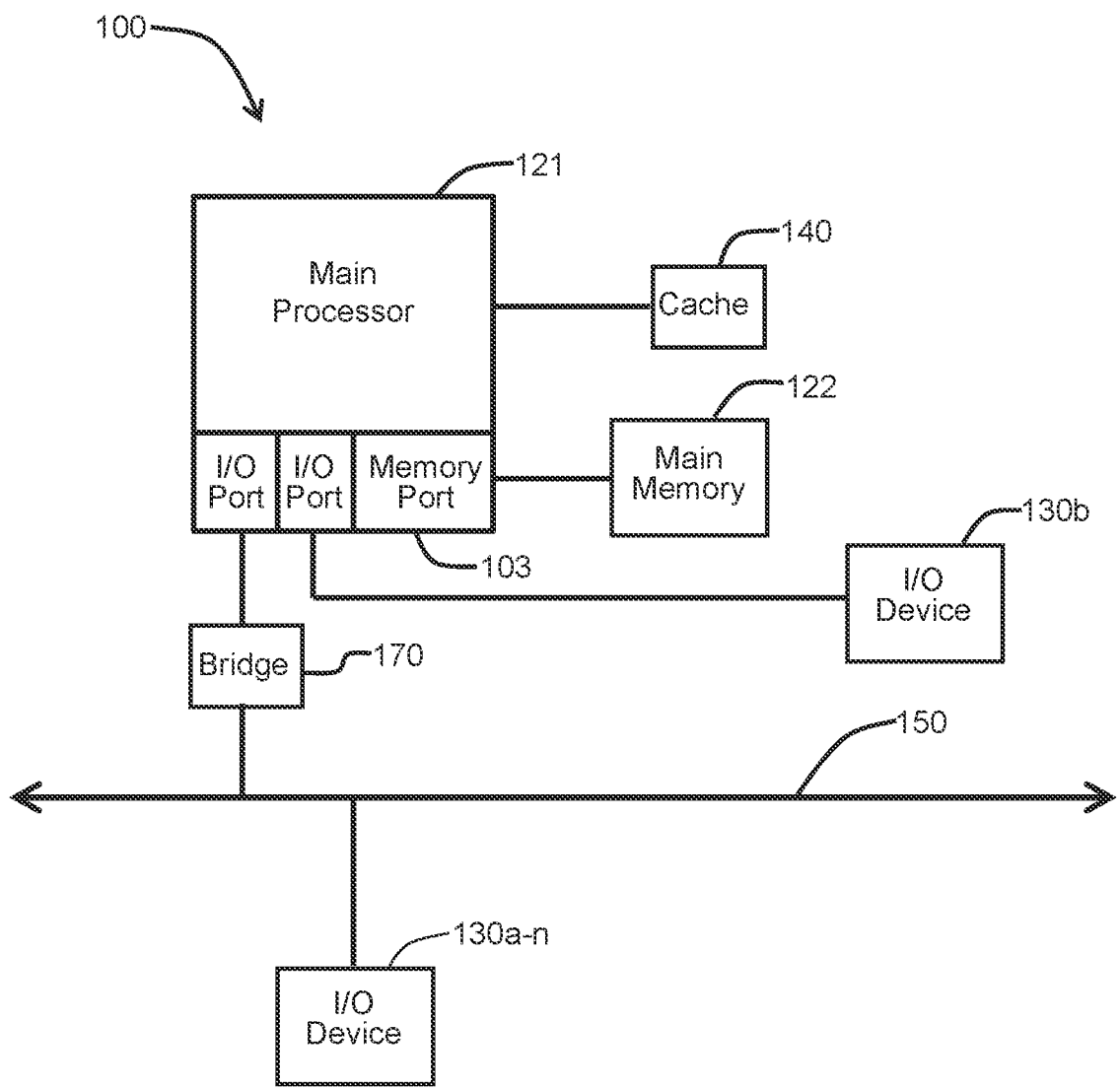

The communications device(s) 102 and access point(s) or network devices 106 can be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the wireless communication devices 102 or network device 106. As shown in FIGS. 1B and 1C, each computing device 100 includes a processor 121 (e.g., central processing unit), and a main memory unit 122. As shown in FIG. 1B, a computing device 100 can include a storage device 128, an installation device 116, a network interface 118, an I/O controller 123, display devices 124a-124n, a keyboard 126 and a pointing device 127, such as a mouse. The storage device 128 can include an operating system and/or software. As shown in FIG. 1C, each computing device 100 can also include additional optional elements, such as a memory port 103, a bridge 170, one or more input/output devices 130a-130n, and a cache memory 140 in communication with the central processing unit or processor 121.

The central processing unit or processor 121 is any logic circuitry that responds to, and processes instructions fetched from the main memory unit 122. In many embodiments, the central processing unit or processor 121 is provided by a microprocessor unit, such as: those manufactured by Intel Corporation of Santa Clara, California; those manufactured by International Business Machines of White Plains, New York; or those manufactured by Advanced Micro Devices of Sunnyvale, California. The computing device 100 can be based on any of these processors, or any other processor capable of operating as described herein.

Main memory unit 122 can be one or more memory chips capable of storing data and allowing any storage location to be directly accessed by the microprocessor or processor 121, such as any type or variant of Static random access memory (SRAM), Dynamic random access memory (DRAM), Ferroelectric RAM (FRAM), NAND Flash, NOR Flash and Solid State Drives (SSD). The main memory unit 122 can be based on any of the above-described memory chips, or any other available memory chips capable of operating as described herein. In the embodiment shown in FIG. 1B, the processor 121 communicates with main memory unit 122 via a system bus 150 (described in more detail below). FIG. 1C depicts an embodiment of a computing device 100 in which the processor communicates directly with main memory unit 122 via a memory port 103. For example, in FIG. 1C the main memory unit 122 can be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory unit 122 and is provided by, for example, SRAM, BSRAM, or EDRAM. In the embodiment shown in FIG. 1C, the processor 121 communicates with various I/O devices 130 via a local system bus (e.g., system bus 150). Various buses can be used to connect the central processing unit or processor 121 to any of the I/O devices 130, for example, a VESA VL bus, an ISA bus, an EISA bus, a Micro Channel Architecture (MCA) bus, a PCI bus, a PCI-X bus, a PCI-Express bus, or a NuBus. For embodiments in which the I/O device is a video display 124, the processor 121 can use an Advanced Graphics Port (AGP) to communicate with the display 124. FIG. 1C depicts an embodiment of a computer or computer system 100 in which the main processor 121 can communicate directly with I/O device 130b, for example via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 130b directly.

A wide variety of I/O devices 130a-130n can be present in the computing device 100. Input devices include keyboards, mice, track pads, trackballs, microphones, dials, touch pads, touch screen, and drawing tablets. Output devices include video displays, speakers, inkjet printers, laser printers, projectors and dye-sublimation printers. The I/O devices can be controlled by an I/O controller 123 as shown in FIG. 1B. The I/O controller can control one or more I/O devices such as a keyboard 126 and a pointing device 127, e.g., a mouse or optical pen. Furthermore, an I/O device can also provide storage and/or an installation medium for the computing device 100. In still other embodiments, the computing device 100 can provide USB connections (not shown) to receive handheld USB storage devices such as the USB Flash Drive line of devices manufactured by Twintech Industry, Inc. of Los Alamitos, California.

Referring again to FIG. 1B, the computing device 100 can support any suitable installation device 116, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 100 can further include a storage device, such as one or more hard disk drives or redundant arrays of independent disks, for storing an operating system and other related software, and for storing application software programs such as any program or software 120 for implementing (e.g., configured and/or designed for) the systems and methods described herein. Optionally, any of the installation devices 116 could also be used as the storage device. Additionally, the operating system and the software can be run from a bootable medium.

Furthermore, the computing device 100 can include a network interface 118 to interface to a network through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS). The network interface 118 can include a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 can include or be connected to one or more display devices 124a-124n. As such, any of the I/O devices 130a-130n and/or the I/O controller 123 can include any type and/or form of suitable hardware, software, or combination of hardware and software to support, enable or provide for the connection and use of the display device(s) 124a-124n by the computing device 100. For example, the computing device 100 can include any type and/or form of video adapter, video card, driver, and/or library to interface, communicate, connect or otherwise use the display device(s) 124a-124n. In one embodiment, a video adapter can include multiple connectors to interface to the display device(s) 124a-124n. In other embodiments, the computing device 100 can include multiple video adapters, with each video adapter connected to the display device(s) 124a-124n. In some embodiments, any portion of the operating system of the computing device 100 can be configured for using multiple display devices 124a-124n. In further embodiments, an I/O device 130 can be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a Fibre Channel bus, a fiber optic bus, a Serial Attached small computer system interface bus, a USB connection, or a HDMI bus.

A computing device 100 of the sort depicted in FIGS. 1B and 1C can operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7, 8 and 10, produced by Microsoft Corporation of Redmond, Washington; MAC OS, produced by Apple Computer of Cupertino, California; WebOS, produced by Research In Motion (RIM); OS/2, produced by International Business Machines of Armonk, New York; and Linux, a freely-available operating system distributed by Caldera Corp. of Salt Lake City, Utah, or any type and/or form of a Unix operating system, among others.

The computer system or computing device 100 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. In some embodiments, the computing device 100 can have different processors, operating systems, and input devices consistent with the device. For example, in one embodiment, the computing device 100 is a smart phone, mobile device, tablet or personal digital assistant. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Aspects of the operating environments and components described above will become apparent in the context of the systems and methods disclosed herein.

B. Control Link Protocols

Disclosed herein are systems for and methods of modulating transmit power based on a "Boost" value. For example, the transmission power can be modulated between a first boost value, Boost, a related boost value, Boost1, etc., determined according to a pre-equalization vector configured for output transceivers for various links of a cable modem. For example, the cable modem can apply the pre-equalization vector as received for substantially flat frequency response curves of an upstream channel between the cable modem and a CMTS, or may adjust the frequency response curves of the upstream channel for substantially non-flat frequency response curves. For example, the cable modem can limit power applied to high attenuation subcarriers (or channels, subchannels, etc.), which may limit power applied to lossy subcarriers, lower cross talk from said subcarriers, increase a power budget for other subcarriers, or decrease a power range window. According to various embodiments, the adjustment to the transmit power (e.g., via a determined signal magnitude) can include adjustments or input from (made at) the cable modem, the CMTS, or an analytics network communicatively coupled with the cable modem (e.g., a BAS). A cable modem or other device can determine and implement proactively, in a transmit power change, what would be a subsequent transmit power increase after the onset of an attenuation impairment. This proactive introduction of the determined subsequent transmit power increase can avoid the period between the transmit power adjustment commands where the transmissions reach the burst receiver with all subcarriers below the target PSD.

Systems and devices of the present disclosure can include full duplex amplifiers (e.g., FDX DOCSIS amplifiers) or frequency division duplex (FDD). For example, any of the power levels provided herein can be based on an upstream power, a downstream power, or a total power in a link (e.g., a sum of an upstream and downstream power). Further, aspects of the present disclosure can be practiced by one or more devices according to an upstream link or a downstream link over a medium. For example, one or more connected nodes can perform aspects of the disclosure in combination with other, such that each device adjusts the power of at least a portion of a full duplex power present in a link. In some implementations, an amplifier can be configured to operate at a tilt over one or more channels. For example, an amplifier can operate between 108 MHz and 684 MHz, wherein a higher frequency signals can correspond to increased power levels (e.g., at a transmitter or burst receiver). The systems and methods herein can normalize the values to a flat or non-flat operation. That is, references to a flat or normalized frequency response can be substituted for a predefined tilt, such as to refer to a tilt of an FDX or other amplifier employing a non-flat baseline frequency response. Such normalization can be between or within channels. For example, in some embodiments, adjustments within and between channels are adjusted to normalize to a non-flat frequency response. In some embodiments, adjustments between channels are adjusted to normalize to a non-flat frequency response, and adjustments within channels (e.g., between subcarriers) are not adjusted (e.g., slight tilt is disregarded).

The cable modem may utilize communication over the analytics network to exchange threshold values, boost values, flags, or other parameters with other cable modems, a CMTS, or other network nodes. For example, the cable modem can supply, via the analytics network, the CMTS with indications of modem-initiated or implemented changes to the power levels, whereupon, the CMTS can update various profile parameters, such as to expect a lower receive power, or reduce a bitrate according to an expected receive power, and convey said updates to the cable modem, or beneficially apply this knowledge to the burst receiver. Indeed, aspects of the present disclosure can be applied to various devices of a network on various uplink or downlink channels.

Systems and devices of the present disclosure can include full duplex amplifiers (e.g., FDX DOCSIS amplifiers). For example, any of the power levels provided herein can be based on an upstream power, a downstream power, or a total power in a link (e.g., a sum of an upstream and downstream power).

For clarity of the disclosure, before proceeding with further description of the systems and methods provided herein, illustrative descriptions of various terms are provided:

A link can refer to or include to a communications pathway between two devices, in some embodiments. For example, a link can include a communications pathway between any of a cable modem, a CMTS, or a BAS. The communications pathways can refer to one or more channels, each channel including one or more subcarriers. A channel can refer to or include a frequency range of a link, in some embodiments. Any number of channels of a link can be bonded to increase an overall data throughput. A channel can correspond to upstream or downstream communication. That is, each channel can be configured to convey information between a first device and a second device. A subcarrier can refer to or include a portion of a channel configured to modulate data via one or more symbols, in some embodiments. For example, the subcarrier can be a communications pathway for an Orthogonal Frequency Division Multiplexing (OFDM) signal corresponding to the frequency spectrum corresponding to the subcarrier portion of the channel. One or more subcarriers can be grouped into a subchannel.

A cable modem termination service (CMTS) may refer to or include any device that receives a pre-equalization probe via a wired connection, and communicates an indication of the received power levels to a cable modem, in some embodiments. The present disclosure is not limited to networks that employ probes. Estimation of received power and indicated channel frequency response equalization or compensation can be accomplished other than on received probes, as is known in the art. A CMTS may schedule network availability and determine power levels, transit time, or otherwise manage the HFC network. A cable modem may refer to or include any device that receives an indication of a power level received at a CMTS, and adjusts a transmission power level based thereupon, in some embodiments. For example, the cable modem may adjust the power level by receiving an indication of a power received by the CMTS, and applying the techniques of the present disclosure. Any number of cable modems and CMTS can be used in a network or system. A broadband access server (BAS) can refer to or include a component to accumulate, store, provide, or receive channel information with respect to one or more cable modems, in some embodiments. For example, a BAS can act as a network gateway, provide IP addresses, or perform other functions. A BAS can be instantiated at one or more devices, such as a server, a modem, or another network-connected device. A circuit can refer to an assemblage of electronic components configured to process or convey information. For example, the circuit can include one or more emitter/receiver pairs configured to transmit or receive data, analog or digital circuitry configured to process information (e.g., to digitally encode information for conveyance over a medium, such as an attenuated DOCSIS link). The digital circuitry can include discrete elements or one or more processors, coupled with memory. A circuit can be implemented in one device (e.g., a CM or CMTS) or across various devices (e.g., a distributed BAS).

A message can refer to or include a signal conveyed from a transmitter to a receiver to convey information to the receiver, in some embodiments. The information conveyed to the receiver can include digitally encoded information from the transmitter. The information conveyed to the receiver can include channel information. For example, the transmitter can convey a wideband pulse such that an amplitude of a pulse received over various frequencies can be indicative of an attenuation of those subcarriers. A message can include a probe or probe response. A probe may refer to or include a message sent to gather information about operational status, performance, or signal quality, in some embodiments. For example, the probe can be sent by a CMTS to a cable modem. The probe can include a wideband pulse, digitally encoded information, or other content, or can request the provision of a wideband pulse, digitally encoded information, or other content. A probe response can refer to or include a message provided responsive to a probe, in some embodiments. For example, the message can include a wideband pulse or digitally encoded information relevant to operational status, performance, or signal quality.

Power transfer, as used with respect to communications links, can refer to or include propagation of a signal between communicatively coupled devices, over a physical medium of the communications links, in some embodiments. For example, a wireless medium can include air; a wired medium can include a coaxial cable, Ethernet cable, or so forth. A transfer function can refer to or include a quantification of the power transfer between the devices. For example, the transfer function can include an indication of a proportion of power provided to the link which is received at a receiving device, time delays, or frequency responses. In some instances, for some bandwidths (e.g., subcarriers), the transfer function can include or be a scalar transfer function. A scalar transfer function can refer to or include a scalar representation of a power transfer, in some embodiments. For example, the scalar representation can be an absolute value (e.g., milli-watts) or relative (e.g., normalized) value (e.g., relative to other received levels, or transmitted levels). A normalized value can refer to or include a value which is scaled according to another measured value, in some embodiments. For example, a scaled indication of a received power level or magnitude (e.g., voltage level) can be scaled to other received levels, sent levels, a rolling average, or calibrated value received at another time or from another device.

A power adjustment can refer to or include an instruction to change a transmission power for a message, in some embodiments. For example, various first power adjustments can correspond to various frequencies (e.g., subcarrier center frequencies) such that first power adjustments can, for an array, vector, or other data structure corresponding to various subcarriers, provide an adjustment (e.g., a pre-equalization vector). The pre-equalization vector can be configured to generate an equal power level for the various subchannels. The equal power levels can refer to or include power levels which resolve to a same digital value according to an analog-to-digital converter (ADC) of a sending or digital-to-analog converter (DAC) of a receiving device. That is, the equal power levels may include variations, ripple, or so forth, which are not detectable by one or more portions of a sending or receiving device (e.g., an emitter/receiver). A power level for one or more links (e.g., subcarriers) of a channel can refer to a total power, or a power density, in some embodiments. For example, a power level can be provided as a power spectral density (e.g., watts/MHz of bandwidth). A second power adjustment can be provided on a channel basis. For example, the second power adjustment can limit an implementation of the first power adjustment, such as by reducing a magnitude of a first channel adjustment, or excluding a subcarrier to control a channel power. A channel power can refer to a power level associated with a channel for communication. For example, the channel power can include a total power, power limit (e.g., upper or lower bound of a dynamic range window), power density (e.g., power spectral density), time-average of a power, or other power level.

A notification can refer to or include an indication of an event, in some embodiments. For example, the event can include a detection of an attenuation or amplification of one or more channels or subcarriers exceeding a threshold, or the attenuation or amplification persisting for greater than a predefined time. The notification can be configured for presentation via a user interface. The user interface can refer to or include a visual, audible, haptic, textual, or other display configured to present information to a user, in some embodiments. For example, a user interface can be presented via an email, text message, status screen (e.g., graphical user interface, secure shell (SSH) terminal, or so forth).

A bandwidth may refer to a range of communication frequencies. Accordingly, the operating bandwidth may include maximum and/or minimum values (e.g., a minimum operating bandwidth, a maximum operating bandwidth). In some embodiments, an operating bandwidth of a particular device refers to a range of frequencies that the particular device may use for network communication. For example, a cable modem and/or a CMTS device may have an operating bandwidth range for first links (e.g., channels) such as 6 MHz or 8 MHz. Each channel, in turn, may include second links (e.g., subcarriers) such as 25 kHz or 50 kHz subcarriers. Values for maximum and minimum operating bandwidths are often defined in communication standards.

Figure 2:
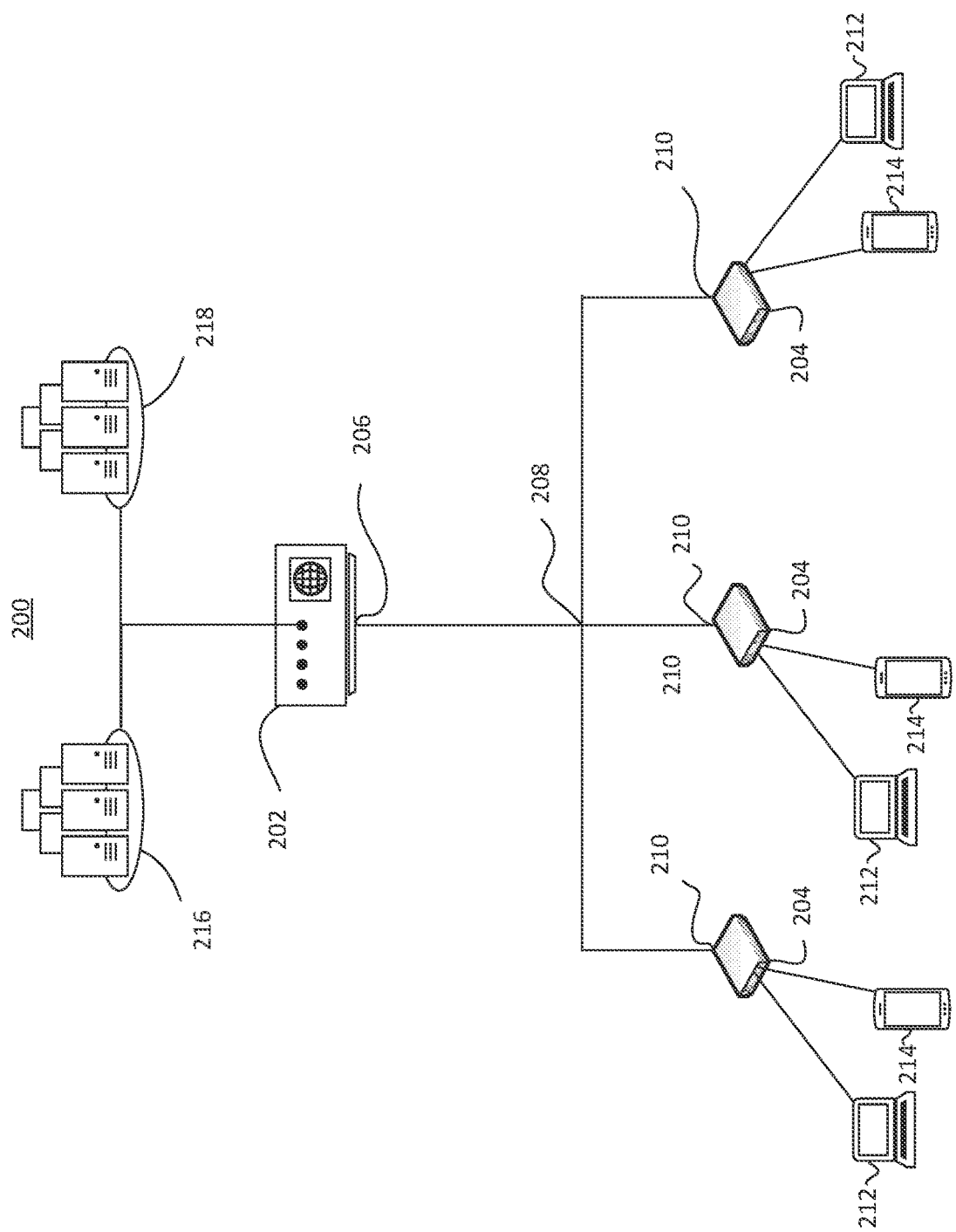
FIG. 2 is a cable network diagram depicting a network including a cable modem termination system (CMTS) and cable modems, according to some embodiments.

Referring to FIG. 2, a cable network diagram 200 is provided, according to some embodiments. A cable modem 204 termination system (CMTS) 202 is communicatively coupled to one or more cable modems 204. The CMTS 202 can schedule network time slices or frequency slices (e.g., according to an orthogonal frequency division multiplexing (OFDM) organization, quadrature amplitude modulation (QAM) organization, or other organization including a time or frequency component). For example, the CMTS 202 can communicate with the cable modem 204 via a data-over-cable service specification (DOCSIS), such as DOCSIS 1.0, 1.1, 2.0, 3.0, 3.1, 4.0, European-DOCSIS, or so forth. Communications originating from the CMTS 202 and terminating at the cable modem 204 may be referred to as downlink or downstream communication.

Communications originating from the cable modem 204 and terminating at the CMTS 202 may be referred to as uplink or upstream communication. The CMTS 202 and various cable modems 204 can communicate over a network, such as a wired hybrid fiber-coaxial (HFC) network. The HFC network can include a first connection 206 proximal to the CMTS 202, a junction 208 such as a coaxial splitter, a second connection 210 proximal to the cable modem 204. In some embodiments, the junction or various connections intermediate to the CMTS 202 and one or more cable modems 204 can include any number of devices employing the operations described herein. For example, any of the CMTS 202, cable modems 204, or amplifiers/repeaters therebetween (not depicted) can adjust pre-eq values according to the present disclosure. In some embodiments, the various device of a cascade or other network can interoperate or operate with a common device (e.g., BAS) to coordinate transmission power adjustments. The coordination can (e.g., according to messaged including pre-equalization information) include determining first information locally, conveying the information to a BAS device, and receiving a command varying from the first information. For example, the BAS can determine values to prevent periodic adjustments along a cascade (e.g., to aid in metastability), can enforce hysteresis, or can provide further information associated with attenuated infrastructure (e.g., can locate a segment of a network for repair or inspection, according to a loss associated therewith).

Various intermediate connections, and other attenuating conditions (e.g., cable temperature, distance, abrasion, bends, discontinuities, etc.) can determine a transfer function between the CMTS 202 and each respective cable modem 204. Such transfer functions can vary over time, frequency, and the like. The transfer functions can include frequency response, time delays, micro-reflections, or the like. A transfer function corresponding to a subcarrier can be or include a scalar indicating a ratio of power received, relative to a power received for other subcarriers or relative to a transmission power.

Some signals exchanged between the CMTS 202 and the cable modems 204 can include communication originating and terminating therebetween. Some signals can originate from, terminate at, or depend upon connected terminal equipment such as the depicted wired devices 212 or wireless devices 214 communicatively coupled to the cable modem 204; a network management service 216 or provisioning system 218 communicatively coupled to the cable modem 204; or the like.

Figure 3:
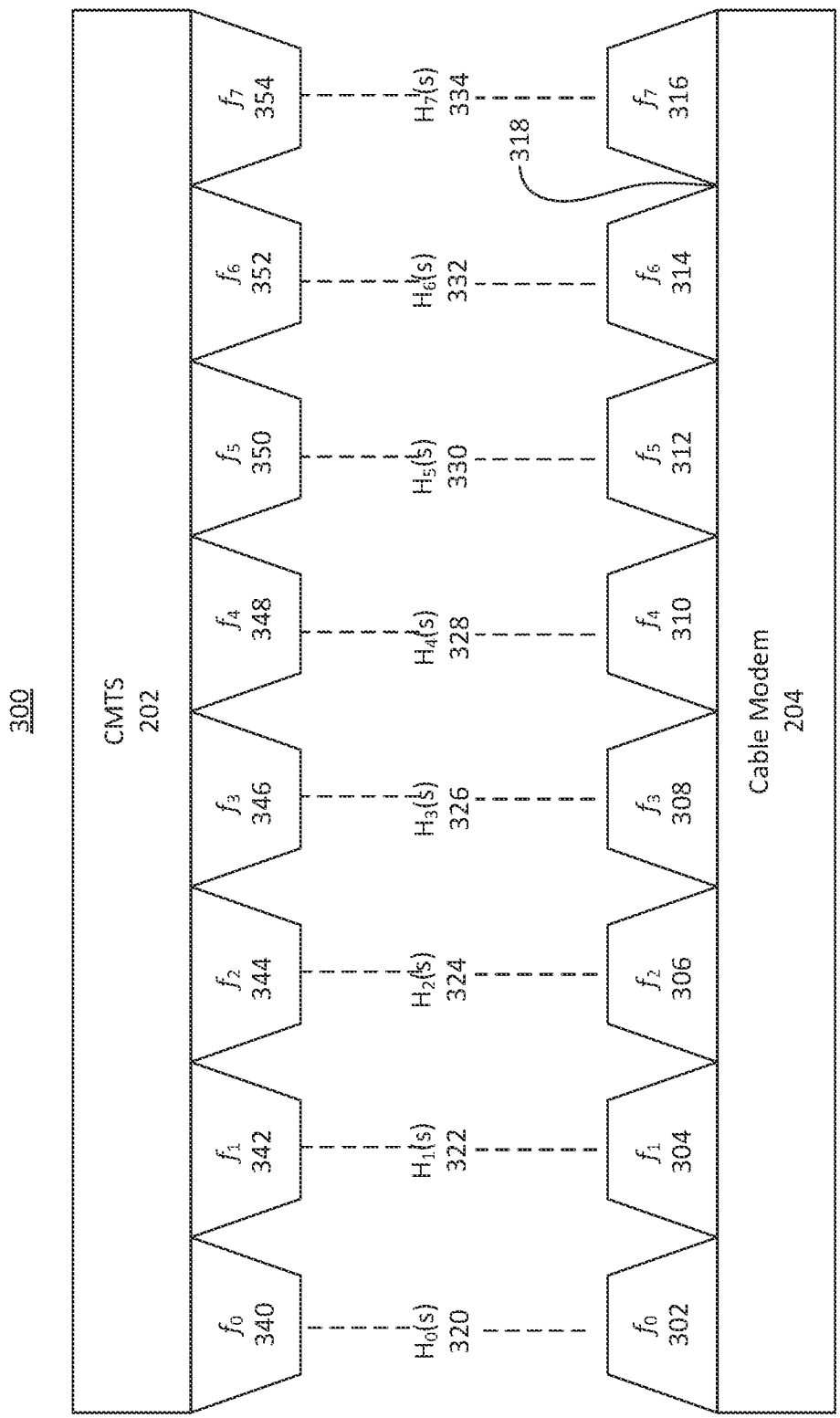
FIG. 3 is a connection diagram of the various links between a cable modem and the CMTS, according to some embodiments.

Referring now to FIG. 3, a connection diagram 300 of the various links between a cable modem 204 and the CMTS 202 is provided. The connection diagram 300 includes eight links merely for ease of presentation. Various embodiments can employ additional or fewer links (e.g., hundreds of links, thousands of links, or so forth). According to various embodiments, each link can include various subcarriers, or be subsumed into an aggregate channel (e.g., may be a subcarrier). For example, the connection diagram 300 can depict a channel having eight subcarriers. The depicted cable modem 204 includes a first CM origin 302, second CM origin 304, third CM origin 306, fourth CM origin 308, fifth CM origin 312, sixth CM origin 314, seventh CM origin 314, and eighth CM origin 316. Each subcarrier can include a center frequency and bandwidth to occupy a bandwidth range, and be associated with a transmit power for a transceiver of the cable modem 204. For example, the various origins can correspond to a frequency range of one or more emitters, such as an output of a digital-to-analog converter (DAC).

Some subcarriers may include or interface with an overlap portion 318. For example, the seventh CM link origin 314 and eighth CM link origin 316 can overlap. Even where bandwidths do not intentionally overlap, some cross talk may impact an adjacent or other link (e.g., based on a harmonic thereof or intermodulation distortion products between a multiplicity of subcarriers). For example, an aggressor link can influence another link (e.g., an adjacent link), which may decrease a signal-to-noise ratio (SNR) of the victim link. According to various embodiments, the adjacent link can be adjacent in frequency, time, or another domain, or otherwise related to the aggressor (e.g., according to the harmonic thereof). For example, an aggressor channel may impose noise on a temporally adjacent channel via signal reflections persisting beyond a time of the control of the channel by the aggressor, or based on transient ramp-up and ramp-down emissions from the aggressor channel transmission circuit, or on a frequency-adjacent channel based on distortion products of the aggressor channel creating energy in the adjacent channel, or spurious noise in the adjacent channel created at the transmitting source. Such illustrative examples are non-limiting; there are other sources of degradation from aggressor channels into adjacent (temporal or frequency) channels. Although depicted as frequency bands, for ease of illustration, the links of the present disclosure can be separated by time bands, frequency bands, or combinations thereof.

The CMTS 202 can include a first CMTS terminus 340, second CMTS terminus 342, third CMTS terminus 344, fourth CMTS terminus 346, fifth CMTS terminus 348, sixth CMTS terminus 350, seventh CMTS terminus 352, and eighth terminus 354. Each respective termini of the CMTS 202 can be associated with a cable modem origin. More particularly, the transfer function describing the communication between the CMTS 202 and the cable modem 204 can include an uplink transfer function which can be further decomposed to a transfer function on a per-subcarrier basis. Such a transfer function can describe an attenuation (or amplification) for each link. For example, a first decomposed transfer function 320, $H_0$ can describe an attenuation between the first CM link origin 302 and the first CMTS terminus 340. Each of a respective second 322, third 324, fourth 326, fifth 328, sixth 330, seventh 332, and eighth decomposed transfer functions 334 can describe the attenuation between the second 304 through eighth CM link origins 316 and the respective second 342 through eighth CMTS link termini 354.

The transfer functions can be or include a scalar representation of a power or voltage of a signal as received at the CMTS 202. For example, power can be received equally across various subcarriers, which can be left unadjusted, according to a unity pre-equalization vector, [1, 1, 1, 1, 1, 1, 1, 1], or can vary between the subcarriers. For example, a vector of received signal magnitude can include varying scalar values according to a tilt, describing a frequency-dependent attenuation (e.g., according to a received magnitude vector such as [0.86, 0.88, 0.90, 0.92, 0.94, 0.96, 0.98, 1.00]). A received power or pre-equalization vector can be normalized such that a maximum or minimum value is set to one, or can be normalized to a predefined value. For example, according to the above mentioned received power vector, a pre-equalization vector can be configured to equalize (e.g., reduce a difference between) the various received power levels. That is, by adjusting a transmitted power by an inverse of a received power value (e.g., a square of a received signal magnitude), the various subcarriers can be equalized.

Substantially non-flat received magnitude vectors can correspond to a power output outside of a DRW window, or which is not achievable by an emitter. For example, a received signal magnitude vector of [1, 1, 1, 0.2, 1, 1, 1, 1] can correspond to a pre-equalization vector of [1, 1, 1, 5, 1, 1, 1, 1], and a normalized power output of [1, 1, 1, 25, 1, 1, 1, 1]. A limit applied to a pre-equalization vector can maintain a DRW window, reduce inter-subcarrier interference, or otherwise maintain communications.

Figure 4:
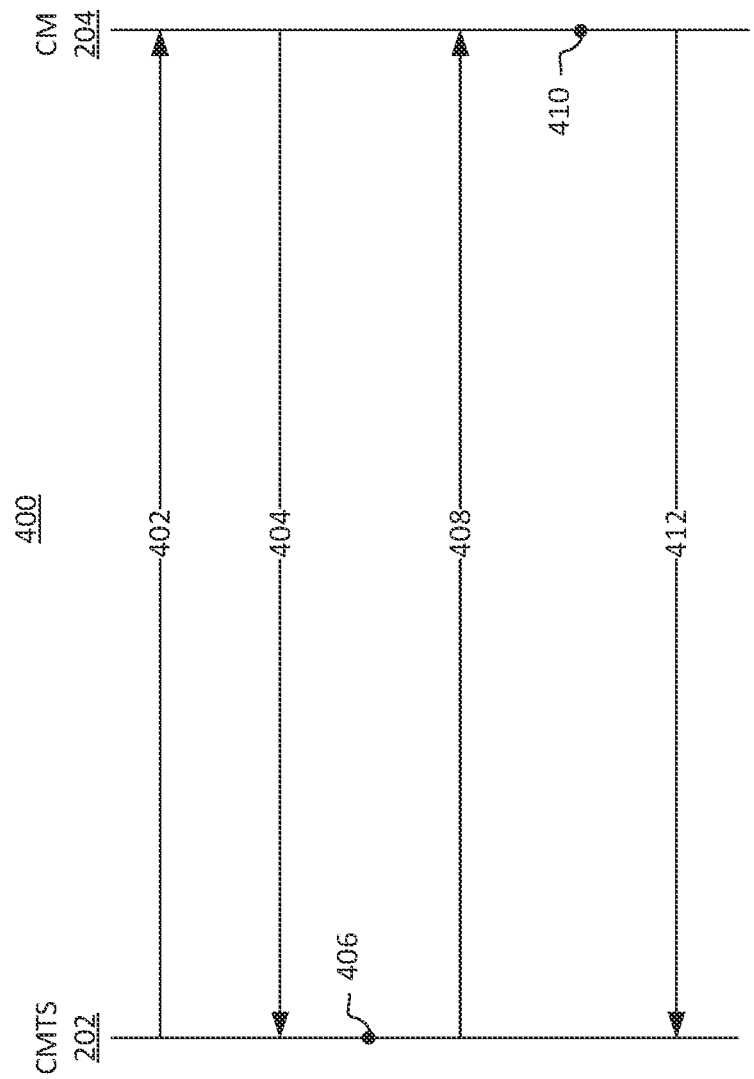
FIG. 4 is a sequence diagram to determine a transfer function between one or more links, according to some embodiments.

Referring now to FIG. 4 and others, a sequence diagram 400 is provided to determine a transfer function between one or more links. Although depicted as a communication between a cable modem 204 and a CMTS 202, in various embodiments, various of the relevant information or processing operations can be conveyed to or processed at other devices, such as a BAS device. For example, further adjustments, limits, or the like can be determined by or based on communication with the BAS. In brief summary, at operation 402, the CMTS 202 initiates a probe request. At operation 404, the cable modem 204 transmits a signal (e.g., a wideband uplink signal) to the CMTS 202. At operation 406, the CMTS 202 determines a transfer function for each link associated with said signal. At operation 408, the cable modem 204 receives an indication of the transfer function associated with each link. At operation 410, the cable modem 204 determines an equalization function associated with each link, based on the indication received from the CMTS 202. At operation 412, the cable modem 204 transmits a message to the CMTS 202 at a power level based on the equalization function. According to various embodiments, various operations can be omitted, substituted, or re-ordered. For example, the CMTS 202 can omit sending the probe request, and can determine a deviation from an expected receive power for data transmissions of the cable modem 204 (e.g., operation 412) and thereafter convey an indication of the transfer function associated with each link to the cable modem 204.

Referring further to FIG. 4, at operation 402, the CMTS 202 sends a request for a signal. For example, the signal request can be a request for a probe signal, or a data signal associated with a response (e.g., a response comprising content generated by an application or other network layer).

At operation 404, the cable modem 204 can transmit a signal to the CMTS 202. For example, the signal can be a probe signal. The probe signal can be transmitted with an equal or other known power for each subcarrier of a channel. The signal can include a series of predefined symbols for one or more of the subcarriers. For example, each subcarrier may transmit a same or different predefined symbol or signal at a predefined power level (e.g., pre-equalization level). In some embodiments, each link may be of a 25 kHz or 50 kHz bandwidth, and the character or signal length may be 20 μs or 40 μs respectively (e.g., for what is sometimes called the fast Fourier transform (FFT) period, and then extended to further duration with addition of a cyclic prefix, and also sometimes with transmit window roll-off).

Still referring to FIG. 4, at operation 406, the CMTS 202 can determine a transfer function (e.g., a frequency response) associated with each link (e.g., subcarrier of a channel). To determine the transfer function, the CMTS 202 can perform a Fourier transform (e.g., a fast-Fourier transform) and determine a frequency content of the symbol or other signal received from the cable modem 204. For example, the CMTS 202 can determine a power or an indication of the power received in frequency bands corresponding to the respective cable modem link origins or CMTS link termini. The CMTS 202 can compare the received power (or energy) to the predefined transmit power. For example, the predefined transmit power can be about 10 dBm, and the receive power can be about 0 dBm. The CMTS 202 determine such a frequency response for each link. The transfer function can be or include a scalar indication of a signal received, such as a normalized signal magnitude or power received by the CMTS.

Figure 5A:
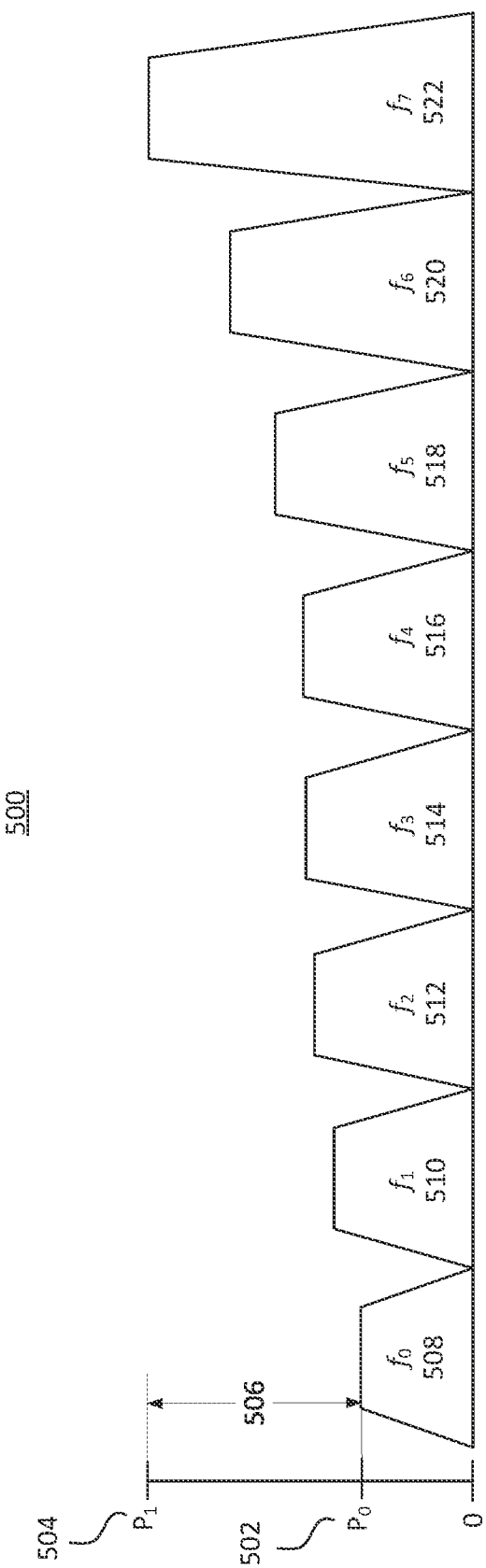
FIG. 5A depicts scaled power levels corresponding to the transmit power level for each link of the cable modem, according to some embodiments.

At operation 408, the CMTS 202 can provide an indication of the transfer function (e.g., the frequency response) for each subcarrier. For example, the CMTS 202 can provide the received power levels, a function describing the frequency response, or one or more pre-equalization parameters. For example, the pre-equalization parameters can define an adjustment to a transmit power for each link of the cable modem 204. For example, FIG. 5A depicts scaled power levels corresponding to the transmit power level for each link of the cable modem 204. The depicted higher frequency signals incur additional attenuation, and thus are provided higher power levels. Such a tilt in the frequency response is not intended to be limiting. According to various signal paths, pre-equalization curves may be inverted (e.g., require higher adjustment at lower frequencies), include band-pass or band-rejection notches, include ripples, include peaking of some frequencies, or otherwise vary from the depiction of FIG. 5A. One skilled in the art will appreciate that a frequency response of a signal path may vary according to various parameters which may, in aggregate, generate any frequency response curve corresponding to any pre-equalization adjustments. The pre-equalization adjustments can scale the signals inverse to a received power (e.g., to cause an equalization of the power received from the various links at a receiver of the CMTS 202).

With continued reference to FIG. 4, at operation 410, the cable modem 204 determines an equalization function associated with each link. The cable modem 204 can determine said equalization function based on the received indication of the transfer function. For example, the indication of the transfer function may include CMTS 202 determined pre-equalization parameters, and the cable modem 204 can determine the equalization function is the application of the CMTS 202 determined pre-equalization parameters to each link. For example, and referring again to a subcarrier channel apportionment 500 of FIG. 5A, the CMTS 202 determined pre-equalization parameters can result in a minimum transmission power 502 and a maximum transmission power 504. The cable modem 204 can determine a power differential 506 between the minimum transmission power 502 and a maximum transmission power 504. Various subcarrier power levels (e.g., a first 508, second 510, third 512, fourth 514, fifth 516, sixth 518, seventh 520, and eighth 522 power level) can be between the minimum transmission power 502 and a maximum transmission power 504.

The cable modem 204 can determine, based on the power differential 506, that the pre-equalization adjustments are adequate. For example, a relatively flat frequency response curve can correspond to relatively small pre-equalization adjustments which are realizable (e.g., do not exceed a transmission power of the cable modem 204), are less than a threshold (e.g., the average power across channels remains within a dynamic range window (DRW), such as 12 dB), and may not impair other upstream channels. However, some pre-equalization adjustments may not be realizable within a power budget, or DRW. Moreover, some realizable pre-equalization adjustments may not improve total latency, throughput, flatness, or the like, such as according to an interaction with another upstream channel. Thus, the cable modem 204 can further adjust the power equalization adjustments received from the CMTS 202, and apply said adjustments to the various CM origin links.

In a non-limiting example, a cable modem 204 having a three-assemblage link (e.g., a channel having three subcarriers) transmits at a same power level over each subcarrier. Such a power level can be expressed as a set of transmit powers according to an arbitrary unit as (1, 1, 1). The received signal magnitude at a CMTS 202 can be expressed as another arbitrary unit. According to a flat response curve, such a receive power/magnitude may be expressed as (1, 1, 1). However, according to a frequency response curve, such a set of receive signal magnitude values may include other values, such as (1, 0.5, 0.25), having a corresponding normalized power value set of (1, 0.25, 0.0625) (e.g., the magnitude squared). According to such a set of values, the received power at the CMTS 202 would be 1.3125 (1+0.25+ 0.0625), rather than 3 (1+1+1) as in the flat case. The CMTS 202 can thus provide pre-equalization values to adjust the power transmission. In DOCSIS, the CMTS 202 can send, to a cable modem 204, values for adjusting the pre-equalization configured to cause flat response at the burst receiver (the CMTS 202), when the cable modem 204 applies the pre-equalization adjustment. The cable modem 204 can include a scale factor in the pre-equalization which maintains a commanded transmit power. For example, the CMTS 202 can determine pre-equalization values by multiplying the inverse of each value of the set, as follows, continuing the example:

$$\frac{1}{1}, \frac{1}{0.5}, \frac{1}{.25} = 1, 2, 4$$

The CM 204 can normalize the pre-equalization values to maintain the same transmit power as follows:

$$\frac{1 + (2)^2 + (4)^2}{1 + 1 + 1} = \frac{21}{3} = 7 \qquad (2)$$

The scaled (normalized) pre-equalization values employed by the cable modem 204 can thereafter be determined as follows:

$$\frac{1}{7^{0.5}}, \frac{2}{7^{0.5}}, \frac{4}{7^{0.5}} = 0.378, 0.756, 01.576$$

Such a technique can adjust the transmitted power to the expected value of the previously transmitted flat response curve (i.e., $\mathbf{0.378^2 + 0.756^2 + 1.576^2}$ $1^2+1^2+1^2=3$). However, the resulting power at the CMTS 202 (or other receiver) is now reduced, with the power of each of the three subcarriers now received at $\frac{1}{7}$ instead of at 1. To achieve the expected value of power at the CMTS 202 after applying the pre-equalization at the cable modem 204, the transmit power will increase, in this example, by the factor 7. By way of explanation, after the onset of the attenuation in a portion of the channel, and the subsequent pre-equalization provided by the cable modem 204, the most attenuated subcarriers are receiving the majority of the cable modem's 204 transmit power, while the low attenuation subcarriers receive the least power. For example, the high attenuation portion of the channel consumes about 83% of the power ($1.576^2/3$), while the low attenuation portion of the channel consumes less than 5% of the power ($0.378^2/3$). Such imbalances can result in, for example, near end cross talk which may impact a SNR and, in turn, lower a bitrate of the channel. Moreover, as Shannon's capacity theorem evidences, throughput is limited by a ratio of signal power to noise power, thus increasing signal power on the most attenuated links may not realize an increased throughput, and may not be power-efficient. For example, with flat noise at the receiver, increasing transmit power in the portion of the channel with the most attenuation is counter to the Shannon capacity theorem, but can realize a relatively flat channel. The throughput of such an approach can diminish responsive to highly non-flat channels, as increased power is pushed into the most attenuated portions of a link. Thus, according to the present disclosure, the cable modem 204 can determine a departure from the signal balancing values determined above (e.g., pre-equalization parameters received by the cable modem 204), and achieve a superior overall performance (e.g., higher bitrates or lower power) within the system.

The cable modem 204 can determine a parameter related to the flatness of a channel (e.g., an OFDMA channel) according to pre-equalization parameters or another indication of the frequency response of the links. For example, the cable modem 204 can determine boost according to an average of $$\left(\frac{\text{MAX}}{|H(f)|}\right)^2$$

where MAX is the largest value of |H(f)| of relevant links (e.g., non-excluded subcarriers of a channel) and H(f) is a transfer function including a frequency response for n links. For each of certain computations, $(1/\text{boost})^{0.5}$ can be provided in dB form (10 log (boost)). Put differently, boost can be defined as the sum from 1 to n of $(\{\text{Max}/|H(fn)|\}^2)/n$. For example, for the above numeric example having the receive power set of (1, 0.5, 0.25), the boost equals $(\Sigma 1^2, (1/0.5)^2(1/0.25)^2)/3=7$ and the boost dB equals 10 log 10(7)= 8.45 dB.

Figure 5B:
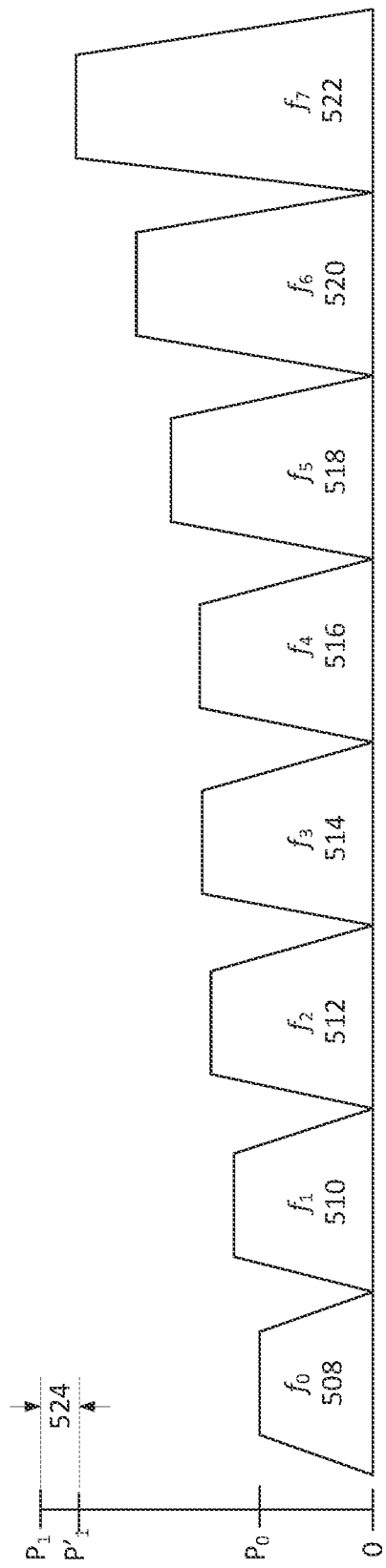
FIG. 5B depicts boost-limited scaled power levels corresponding to the transmit power level for each link of the cable modem, according to some embodiments.

The boost dB can be employed to calculate an offset therefrom, such as an offset of 1 dB (corresponding to 80% of the maximum boost), 2 dB (corresponding to 64% of the maximum boost), and so forth. Thus, a dB or linear offset can be applied to a boost to power limit a number of subcarriers. For example, the cable modem 204 can compare a frequency response between subcarriers to determine lossy subcarriers which are increasing the boost metric. For example, the link associated with the normalized 0.25 magnitude at the CMTS 202 can be power limited at 7.45 dB (8.45-1), 6.45 dB (8.45-2), or another value. In some embodiments, the subchannels can be excluded based on the attenuation (e.g., whereupon a power limit can be redistributed to other channels according to the systems and methods disclosed herein). As depicted by FIG. 5B, the boost of the limited channel can be evidenced by the reduction offset 524 of the transmit power 522, from the original power $P_1$ to $P'_1$. For example, the difference therebetween can be the offset described above (e.g., may be 1 dB, 2 dB, or another value). In some implementations, the offset may reduce the value of the power differential 506 which may cause a reduction in cross-talk, avoid an adjustment of the DRW which may cause in increase in a bit error rate (BER) or modulation error rate (MER) (e.g., TX_MER), thus improving overall channel capacity.

In some embodiments, the cable modem 204 may include a stored pre-equalization vector (E(f)) comprising pre-equalization parameters. For example, the pre-equalization vector (E(f)) can be received from the CMTS 202 or the cable modem can compute the pre-equalization vector E(f) from a previous pre-equalization vector and a change-value for each subcarrier's pre-equalization value. The cable modem 204 can similarly determine boost from such a vector. For example, E(f) can be set as the inverse of H(f), and a minimum E(f) can be set as the smallest value of a non-excluded link (e.g., subcarrier). For each link, the cable modem 204 can determine S(fn) as $\{|E(fn)|/\min\}^2$. The cable modem 204 can then determine boost by averaging the S(fn) values. Boost dB can define the increase in cable modem 204 transmit power to normalize the power received by the CMTS 202 which can be employed to re-establish the target received PSD at the receiver. The cable modem 204 can thereafter offset from boost or boost dB to limit power supplied to highly attenuated channels. Some of the subcarriers, (e.g., those that have the limited pre-equalization values) can arrive at the CMTS 202 receiver below the target PSD, but the non-limited subcarriers will arrive at the target PSD, and the cable modem 204 transmit power may not require the full increase of boost dB to achieve that. The CMTS 202 can "know" the subcarriers which will be limited with side-communications such as BAS, or if the CMTS 202 implements aspects of the present disclosure. In such an embodiment, the CMTS can provide for (command the cable modem 204 to transmit) lower constellation bit-loadings in the subcarriers that are limited to arrive at the receiver at below target PSD values intentionally.

Figure 6A:
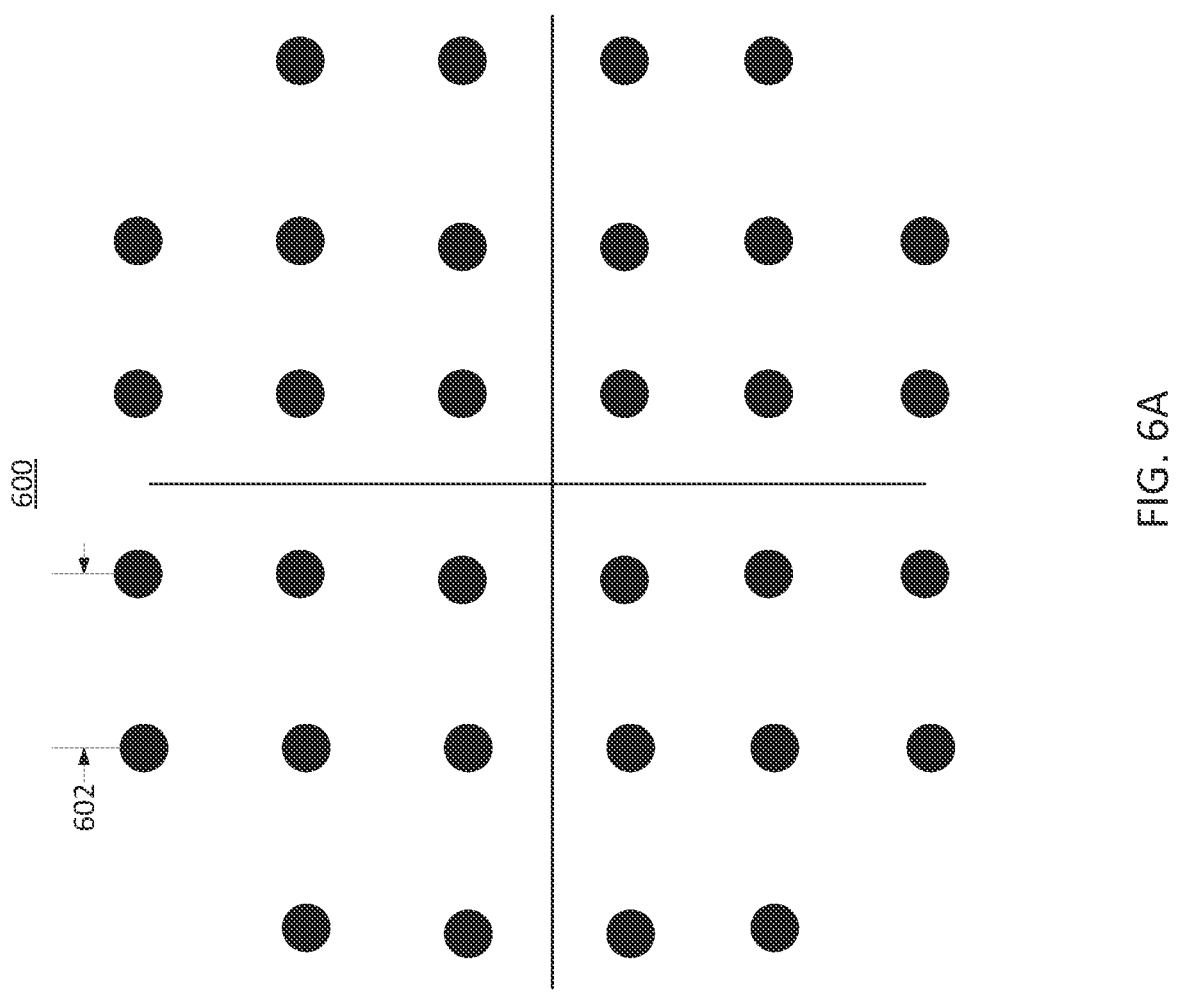
FIG. 6A is a symbolic depiction of a QAM-32 constellation, according to some embodiments.
Figure 6B:
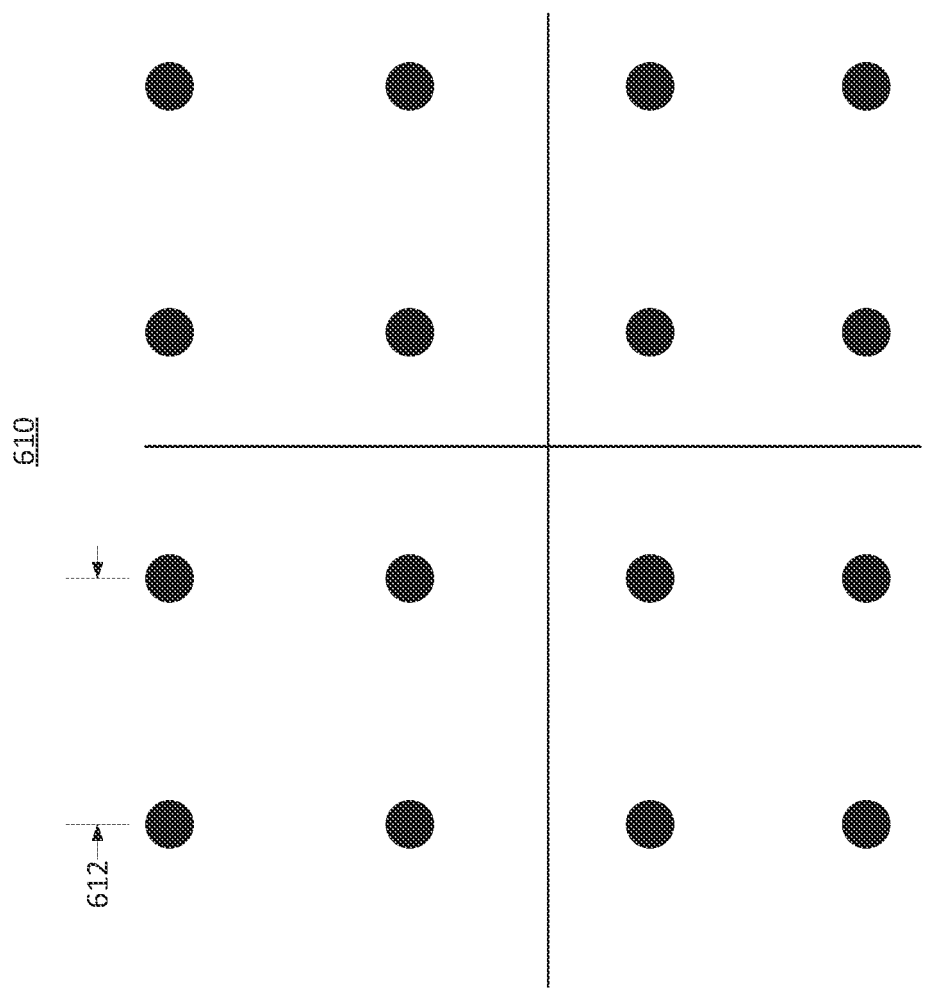
FIG. 6B is a symbolic depiction of a QAM-16 constellation, according to some embodiments.

The cable modem 204 can further communicate the limits to other cable modems 204 or the CMTS 202 to expect the lower power level, and may further modify channel parameters. For example, the CMTS 202 can define a lower density constellation. In one embodiment, the lower density constellation can include the QAM-16 constellation 610 of FIG. 6B, which may replace, for example, the QAM-32 constellation 600 of FIG. 6A. As depicted the lower density symbol spacing 612 includes greater symbol spacing than the higher density symbol spacing 602, and thus may reduce a corresponding BER at a given power density, particularly, when the power received by the CMTS 202 will be less than the target power level. Such depicted constellations are merely provided for ease of presentation. Many systems of the present disclosure may employ, for example, QAM-64, QAM-256, or other constellations.

According to various embodiments, the CMTS 202 can perform the various operations of operation 410. For example, the CMTS 202 can determine a frequency response, and calculate the pre-equalization adjustments to normalize a received power from the cable modem 204. The CMTS 202 can determine the boost metric, and provide the adjusted pre-equalization adjustments to the cable modem 204. The CMTS 202 can provide the adjusted pre-equalization adjustments via a side-band link of HFC, or an out of band communication (e.g., via another network providing network communication between the cable modem 204 and the CMTS 202). The side-band link of HFC, or an out of band communication can be or include a BAS network as described herein. According to various embodiments, a BAS or other device can determine the adjustments for conveyance to the cable modem 204 (e.g., via the CMTS 202).

At operation 412, the cable modem 204 transmits a message to the CMTS 202 having adjusted pre-equalization adjustments. For example, the cable modem 204 can provide the message over a first portion of non-limited subcarriers having a same pre-equalization adjustment as received by the cable modem 204, by the CMTS 202. The cable modem 204 can further provide the message over a second portion of limited links including adjusted (e.g., limited) links. The cable modem 204 can further omit a message from one or more non-excluded links. For example, the CMTS 202 may not identify the omitted link as an excluded link, but the cable modem 204 can determine that the link should be omitted based on a boost associated with the link. For example, the cable modem 204 can omit a link based on a boost exceeding a threshold. Such a determination can be based on multiple links. For example, if a single link (e.g., subcarrier) is associated with a high boost, such that a remaining number of subcarriers could operate at a lower power level, the cable modem 204 can omit the link (e.g., to lower a noise floor, reduce energy usage, etc.), or otherwise reduce power to the attenuated links.

Figure 7:
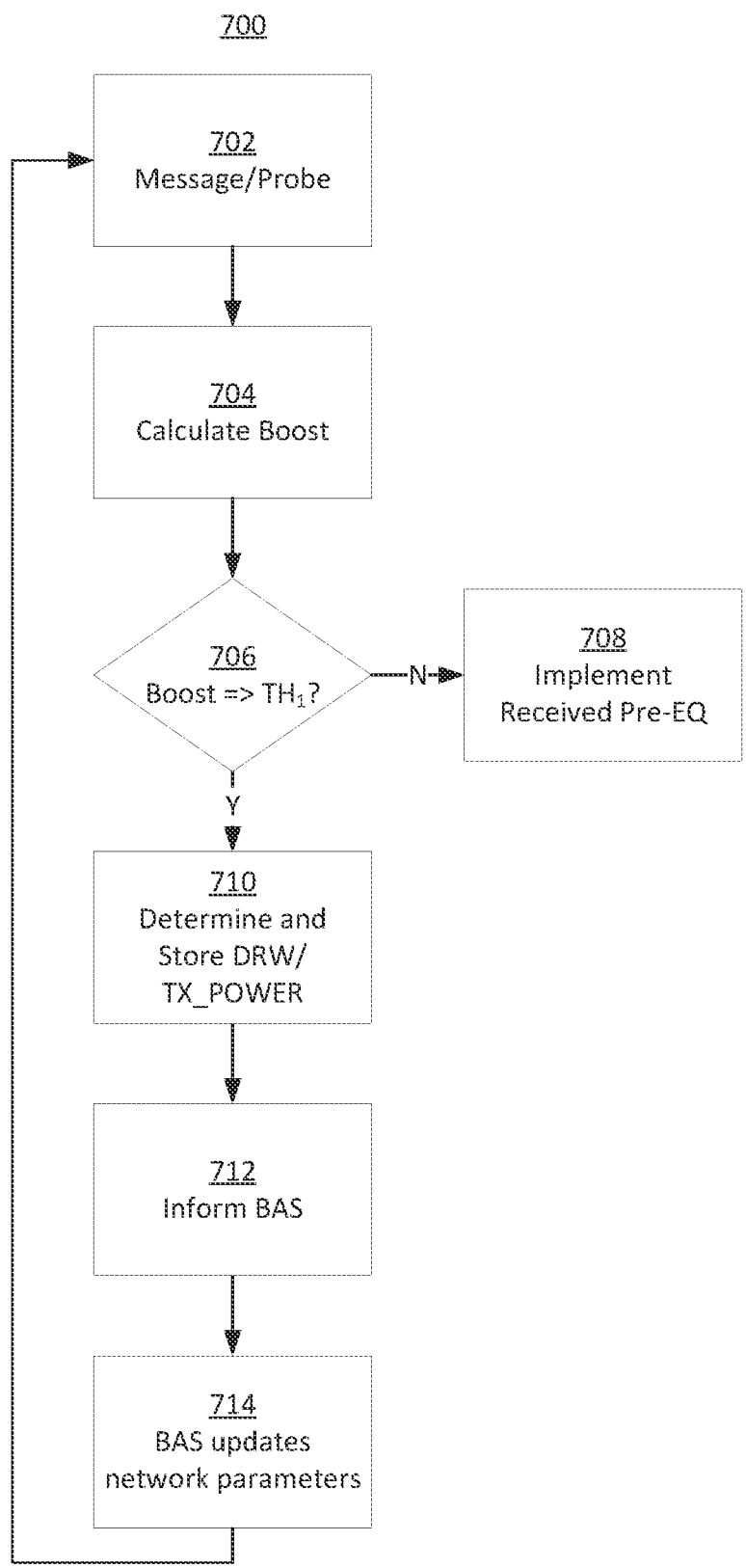
FIG. 7 depicts a flow diagram of a method, according to some embodiments.

Referring now to FIG. 7, a flow diagram of a method 700 is provided, according to an illustrative embodiment. In brief summary, at operation 702, the cable modem 204 receives a probe response. At operation 704, the cable modem 204 calculates a boost parameter. At operation 706, the cable modem 204 compares the boost to a threshold, $TH_1$. At operation 708, the cable modem 204 implements a pre-equalization vector received from the CMTS 202. The pre-equalization vector may be or include a plurality of adjustment values for a transmitter of the cable modem 204, such as a power level adjustment. At operation 710, the cable modem 204 determines and stores a DRW and transmit power level. At operation 712, the cable modem 204 conveys the information to an analytic system (BAS). At operation 714, the BAS can adjust network parameters based on the information from the cable modem 204. According to various embodiments, various operations can be omitted, substituted, or re-ordered.

Referring again to operation 702, and in further detail, the cable modem 204 receives an indication of a power level received by a device in network communication therewith. For example, the cable modem 204 can receive a pre-equalization vector including various pre-equalization parameters, which are also referred to, herein, as pre-equalization adjustment parameters or as a pre-equalization vector. The cable modem 204 can receive the values in response to sending a signal, such as a probe signal to a CMTS 202, which may, in turn, be responsive to an originating message/probe request from the CMTS 202. The indication of the power level can include other information, including information discussed with regard to other devices (e.g., the CMTS 202 or other devices can determine boost or offsets therefrom).

Referring again to operation 704, and in further detail, the cable modem 204 calculates boost, such as a linear boost value, boost dB, or the like, and in some embodiments, determines boost1 (described further henceforth). Such a determination is further described above with reference to, for example, to operation 410 of the sequence diagram 400 of FIG. 4, and elsewhere.

At operation 706, the cable modem 204 compares the boost to a threshold, $TH_1$. $TH_1$ may refer to a threshold to limit the power. According to some embodiments, $TH_1$ can be a pre-defined value, or can be generated locally by the cable modem 204 based on a DRW, power spectral density, or the like. In general, impairments may be accompanied by a new flat loss in the channel frequency response, in addition to the non-flat frequency response caused by an impairment. In some cases such as amplifiers beginning to fail, there may be resonant peaking (as one example) that may have some actual new gain associated with the impairment. To account for a new flat gain or loss in the channel frequency response, a loss adjustment term is introduced. This loss term is K, in dB. K is positive when there is a flat loss, and K is negative when there is a flat gain. In some embodiments, to accommodate the flat loss, a term associated with boost is introduced, boost1. For example, an unadjusted boost (not incorporating boost1) can be based on a flat frequency response prior to an onset of impairment, and the unimpaired portions of the channel frequency response maintain their previous transfer function between the cable modem 204 and the CMTS 202. A flat loss, K, (or gain which would have negative K) can correspond to resonant peaking, ripple, or other signal phenomena observed over all or a portion of a channel. An attenuation of all of the subcarriers can correspond to an offset which is not a non-flat response. The flat loss, K, can be provided, such that a sum of two commanded power adjustments (e.g., a first adjustment to flatten a response and a second to adjust overall power) can be represented by the term. That is, expressed in dB, the adjustment term for flat loss, K, can be depicted as.

$$CMD1 + CMD2 - \text{Boost} = K$$

The CMD 1 can be an adjustment command provided from a perspective of a CMTS 202 (e.g., can be determined without employing the systems or methods of the present disclosure). The adjustment term, K, can be greater or lesser than 1 dB, according to a current and prior pre-eq vector or power adjustment (e.g., locally determined, or from the CMTS). Boost, as provided above, is the average of S(fn) where S(fn) is $(\text{Max}/|H(fn)|)^2$ and Max is the maximum value of |H(fn)| over all subcarriers. As further indicated, an adjusted subcarrier channel response, $S_{adj}(fn)$ can be provided as 1/S(fn). Consequently, the $S_{adj}(fn)$ values can normalize to 1 or less, based on the inverted S(fn) values which are normalized to 1 or more. With a boost based on the $S_{adj}(fn)$ values (e.g., an average thereof), the corresponding boost (in dB) will be a negative value (or zero if the channel is flat). This value of boost based on $S_{adj}(fn)$ can be referred to as boost1. Thus, the adjusted boost, boost1, (the average of Sadj(fn)), can be provided as, in dB, defining the non-flat loss of the impairment, K such that:

$$\text{Boost1} = K - CMD1$$

It follows that (also provided in DB):

$$CMD2 = \text{Boost} + \text{Boost1}$$

The K term can be zero where, as described above, CMD1 (dB) is positive and the additive inverse of boost1 (which is negative in dB). The adjusted boost, boost1, and the flat loss, K, can be used with boost or the limited variations of boost in any of the systems methods or operations of the present disclosure (e.g., the system 200 of FIG. 2, the method 400 of FIG. 4), or so forth. Put differently, in some embodiments, boost or limited versions, boost", combined with boost1 (calculated from $S_{adj}(fn)$, which can be derived from S(fn), rather than from S(fn)" can predict or provide the anticipatory CMD2. Where the limiting of some pre-equalization values has provided that boost has been limited and now due to that limiting has value boost", then $$CMD2 = \text{Boost}'' + \text{Boost1}$$

The anticipatory determination of the prediction of the subsequent second command of transmit power to the cable modem 204, can be employed wherein some subcarrier pre-equalization values are limited.

In some embodiments, the systems and methods of the present disclosure can be employed with memory states. For example, an impairment can be dynamic and persist, wherein determinations for subsequent pre-equalization vector changes can concatenate, and memory states ("bookkeeping") of all or some transmit power commands sent to cable modem 204, can be stored. The systems and methods can incorporate knowledge of how the CMTS 202 computes transmit power commands after limiting on some subcarriers' pre-equalization values has started (e.g., those limited subcarriers may be excluded from subsequent transmit power change commands to cable modem 202), or to account for the fact that the CMTS may or may not send pre-equalization updates to previously limited subcarriers. In some embodiments, a device can send the pre-equalization commands for known limited subcarriers as "normal" while also neglecting them for purposes of the next transmit power change command. Continued anticipatory transmit power commands can be based on the bookkeeping and a recursion on boost1. After an anticipatory inclusion of a second command is included in a first command, in the next pre-equalization vector update and the associated next command change in transmit power, the computation for the new anticipatory command CMD2 can follow:

$$CMD2 = \text{Boost}(m) - \text{Boost}(m-1) + Boost1(m) - Boost1(m-1)$$

where Boost(m) and Boost1(m) are the currently (newly) calculated values of boost and boost1.

A non-limiting illustrative example is provided in the case of resonant peaking. First $|H(fn)|^2$ can be provided as [11, 1, 1, 1, 1, 1, 1, 1, 1, 1, 1]. Pre-equalization can be provided as $1/(11)^{0.5} \approx 3.3$ for the first subcarrier. An average of received power can be provided as $(11+9(1))/10=2$. Thus, a first adjustment received from the CMTS 202 or determined locally can be 0.5 (−3 dB). The average power of the pre-eq values is 10/11. A normalized pre-equalization vector follows: $[(1/10)^{0.5}, (11/10)^{0.5}, (11/10)^{0.5}, (11/10)^{0.5}, (11/10)^{0.5}, (11/10)^{0.5}, (11/10)^{0.5} (11/10)^{0.5}, (11/10)^{0.5}, (11/10)^{0.5}]$. S(fn) is [1, 11, 11, 11, 11, 11, 11, 11, 11, 11, 11], which averages to boost of 10. $S_{adj}$ are merely the inverse, [1, 1/11, 1/11, 1/11, 1/11, 1/11, 1/11, 1/11, 1/11, 1/11, 1/11]. Adjusted boost (boost1) as provided above is the average of $S_{adj}(fn)=20/110=2/11=-7.4$ dB.

The power provided according to such vectors (e.g., at the receiver, CMTS 202 from the CM 204) is 11/10 for each subcarrier (0.41 dB). Where the first adjustment (CMD1) as above, is −3 dB, a net power received at the receiver is 11/20 if the CMD1 is transmitted as determined, −3 dB. With the pre-equalization and CMD1, the combined power received at the CMTS 202 will be −2.6 dB, and result in CMD2 of 2.6 dB. Thus, following the CMD1 of −3 dB, the next command, CMD2 will be 2.6 dB. Boost1 was-7.4 dB in this example, and boost was 10 (or 10 dB), so the anticipatory CMD2 will be CMD2 equals boost plus boost1, or 2.6=10+−7.4.

FIG. 7 shows the steps in the method for identifying when there is or is not significant non-flatness in the frequency response of an OFDMA channel of the HFC plant connecting the cable modem 204 to the burst receiver in CMTS 202. According to some embodiments, $TH_1$ can be received via the BAS. $TH_1$ can be used to indicate a boost indicative of a significantly non-flat vector. For example, a vector which is realized without increasing a power beyond a threshold can be indicative of a channel frequency response which is not significantly non-flat, and the cable modem 204 can adjust the pre-equalization vector as described herein. Upon a determination that the boost is not greater than the threshold $TH_1$, the cable modem 204 can proceed to operation 708. Upon determining that the boost exceeds the threshold $TH_1$, the cable modem 204 can proceed to operation 710, where storing of information and informing system monitors of the detection (presence) of significant non-flat channel frequency response is described.

The BAS can be or include various cable modems 204 which are in network communication. Thus, references to information conveyed to the cable modem 204 can, according to some embodiments, disclose that information being received from the BAS can also be sent to the BAS (and vice versa). For example, the BAS may be or include a mesh network distributing various functions thereof, or include or be in network communication with a command node to generate or adjust the various thresholds, parameters, or other information conveyed with or over the BAS. Any BAS node may include storage to store any information conveyed via the BAS, which may characterize the network such as to locate physical faults, improve performance, or otherwise manage the HFC network. The BAS can generate a notification indicating a condition of a channel. For example, a channel having a persistently degraded channel may be indicative of a physical condition, which may be indicative of a condition of a cable, junction, amplifier, or so forth. For example, the notification can identify a one or more devices or connections which may be damaged or otherwise degraded.

At operation 708, the cable modem 204 can implement the pre-equalization values received from to CMTS 202 incident to operation 702, responsive to the determination that the boost is not greater than the threshold $TH_1$. The cable modem 204 can further increase a total transmission power according to the boost parameter (an anticipatory implementation of the expected CMD2 in addition to the already-provided CMD1), wherein the boost parameter (and boost1) can cause a normalized receipt of subcarriers which are received at a CMTS. In some embodiments, the cable modem 204 can transmit a message according to a normalized vector and thereafter receive a further command to adjust a transmit power to normalize a received power at the CMTS (e.g., by an amount equal to the amount indicated by the boost).

At operation 710, the cable modem 204 can determine that adjustments to the parameters of the various subcarriers may be used. For example, the cable modem 204 can determine an adjustment to DRW, transmit power associated with one or more link (e.g., subcarrier) for one or more channels of the modem, or the like. The determination can be responsive to an indication received (e.g., from a CMTS or a BAS), or can be determined locally at the cable modem. For example, the change to the power can be equal to, based on, or unrelated to a commanded power delta received, CMD1 (e.g., from the CMTS 202). For example, the cable modem 204 can determine (or receive, from a BAS), a value which is different from CMD1. The value can include or be based on the boost value or one or more predefined threshold. For example, the value can be determined by adding CMD1 to the boost value. In another embodiment, the cable modem 204 implements as its transmit power in the first response from the CMTS 202, the value of CMD1 plus the anticipated CMD2, which is equivalent to CMD1 plus boost plus boost1, if no limiting of subcarrier pre-equalization values is applied. Or if limiting is applied, the transmit power change command in the first response to the CM 204 can be equal to CMD1 plus boost" plus boost1.

In some embodiments, the cable modem 204 can compare the value of CMD1 (the actual transmit power command from a CMTS 202 which does not employ certain aspects of the present disclosure) plus CMD2, e.g., the combined transmit power change in an anticipatory embodiment, to zero (e.g., may not implement negative values in the first transmit power change). Then, in the case of a negative value for CMD1 plus CMD2, the cable modem 204 can identify resonant peaking or another indication evidencing signal amplification. The cable modem 204 can limit an anticipatory change in transmit power based on the indication. The cable modem 204 can determine a power spectrum density for a dynamic range window, based on a channel width (e.g., for a 1.6 MHz channel). The cable modem 204 can compare the (non-negative) value to the power spectrum density, and select a lesser of the two to adjust a total transmit power. The cable modem 204 can determine an equalization vector based on a transmit power limited by the selected total transmit power. Such an equalization vector can be employed rather than the anticipatory command change of CMD1 plus CMD2, in some embodiments.

Referring again to operation 712, and in further detail, the cable modem 204 can convey any adjustments of operation 710 with another node connected thereto via the BAS. For example, the cable modem 204 can convey any limited links or adjustments to parameters thereof to other cable modems 204, CMTS 202, or control devices of the BAS which may, in turn, update network parameters based thereupon or propagate said adjustments and the like to the CMTS 202.

At operation 714, in response to the receipt of information related to operation 712, the BAS may adjust a DRW algorithm, a constellation set or other profile changes, power command, adjust an error count threshold/response threshold to schedule or otherwise manage the HFC network responsive to the cable modem 204 adjustments communicated via the BAS. For example, the CMTS 202 may adjust commanded power levels responsive to or in anticipation of adjustments at the cable modem 204, or adjust bitrates of links (e.g., increase bitrates of low-attenuation links or decrease bitrates of high attenuation links). In some embodiments, the CMTS 202 may adjust error tolerance, such as to accept a higher level of errors on a known high-attenuation link, rather than increase a power level thereof which may impact other links. In some embodiments, the updates can depend on a previously conveyed or stored value, such as an error level or an indication of a limited link (e.g., the CMTS 202 may adjust a constellation type based on an error count and a link power which may or may not include a boost related adjustment).

According to some embodiments, the cable modem 204 can, (locally or incident to BAS communication) determine changes to a DRW algorithm, a constellation set, or other profile changes. The cable modem 204 or the BAS may, in turn, communicate said changes over the HFC or another network (e.g., to the CMTS 202). Put differently, the BAS may enable a distribution of certain CMTS 202 functions, or may be employed to perform functions not presently performed for HFC networks.

Figure 8:
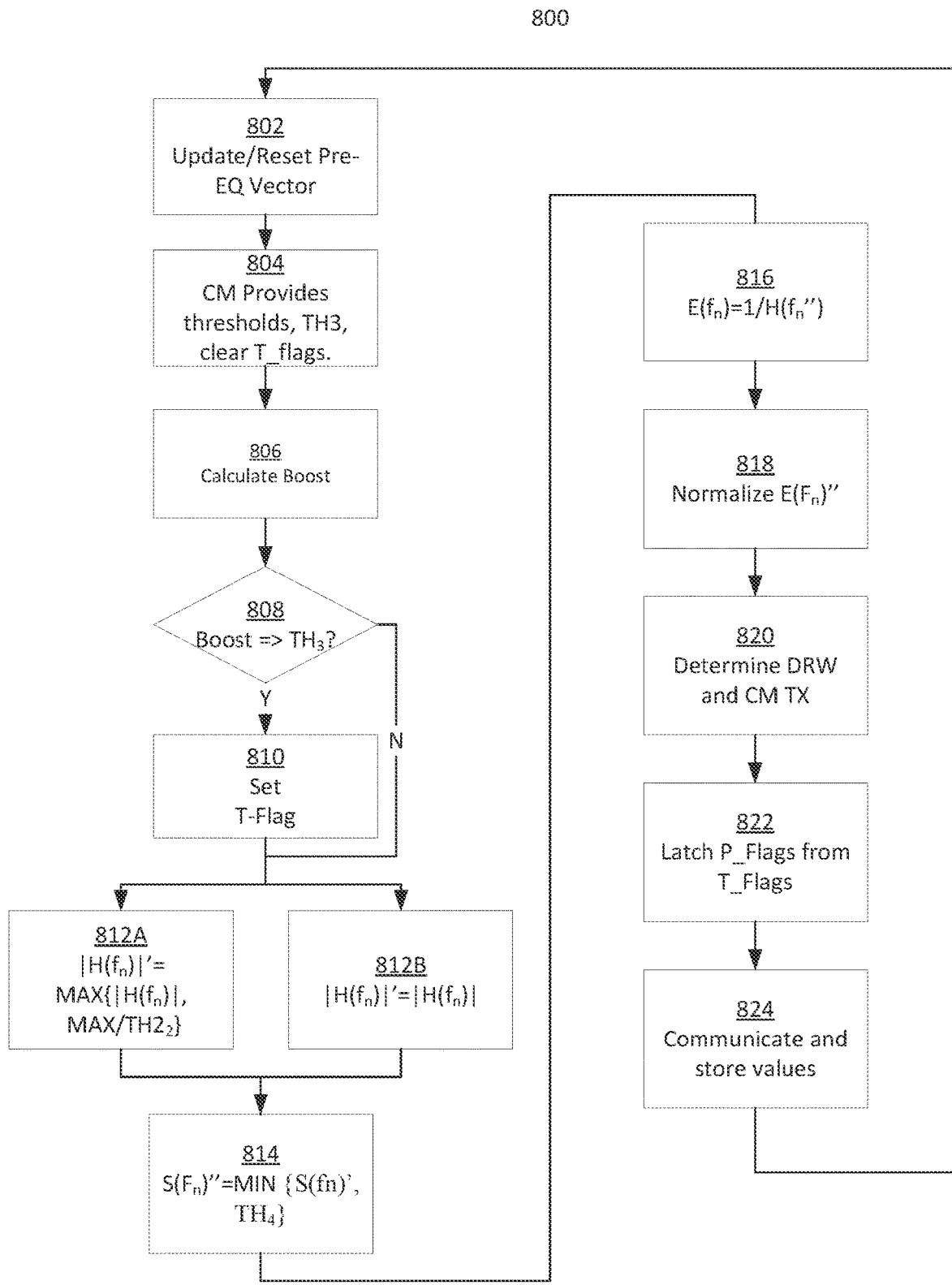
FIG. 8 depicts a flow diagram of another method, according to some embodiments.

Referring now to FIG. 8, a flow diagram of another method 800 is provided, according to an illustrative embodiment. This method can be used to limit cable modem 204 pre-equalization values in some instances in order to manage the cable modem 204 performance in the network. In brief summary, at operation 802, the cable modem 204 resets or updates a pre-equalization vector. At operation 804, the cable modem 204 provides a threshold, $TH_3$ and clears any temporary flags (e.g., T_FLAGS). At operation 806, the cable modem 204 calculates a boost parameter. At operation 808, the cable modem 204 compares the boost to a threshold, $TH_3$. $TH_3$ is a maximum value of the boost which is implemented in the cable modem 204. For any value of boost exceeding $TH_3$, (e.g., the average of S(fn)), one or more subcarriers can correspond to a limited pre-equalization value, such that the resulting value for the average of the modified values, S(fn)" (boost"), is limited. The average of S(fn)" corresponding to the implemented pre-equalization values, can be less than or equal to $TH_3$, based on the operation of the method 800.

At operation 810, the cable modem 204 sets a temporary flag indicating the boost, prior to an application of at least some limiting pre-equalization values, exceeds the threshold, $TH_3$. At operation 812A/B, the cable modem 204 determines $|H(f_n)|'$, such as by limiting low values of $|H(f_n)|$ according to a threshold, $TH_2$. Such limiting can provide a limit on any individual subcarrier pre-equalization value, whether or not the average of S(fn) exceeds $TH_3$. The result of operation 812A/B is S(fn)', can ensure that no value of S(fn)' exceeds the square of $TH_2$. At operation 814, if the average of S(fn)' is larger than $TH_3$, the cable modem 204 limits the individual values of $|H(f_n)|'$ based on a threshold, $TH_4$. The value of $TH_4$ can be determined according to the limit applied to individual S(fn)', limiting at least one subcarrier pre-equalization value of S(fn)', such that:

$$S(fn)'' = \text{MIN}\{S(fn)', TH_4\}$$

and $TH_4$ is determined to provide that the average of S(fn)" is $TH_3$.

At operation 816, the cable modem 204 generates an adjusted pre-equalization vector, E(fn)". At operation 818, the cable modem 204 normalizes the pre-equalization vector. At operation 820, the cable modem 204 determines a DRW and transmit power. At operation 822, the cable modem 204 latches permanent flags from temporary flags. At operation 824, the cable modem 204 communicates and stores various employed or intermediate values.

Referring again to operation 802, and in further detail, the cable modem 204 can update a pre-equalization vector received from the CMTS 202. For example, the cable modem 204 can store the pre-equalization vectors in a memory such as RAM, a register, (e.g., a tap adjustment register), or the like. According to some embodiments, the cable modem 204 may be the only repository for the pre-equalization parameters of the pre-equalization vectors. For example, the CMTS 202 may not store the pre-equalization parameters, because the CMTS 202 may not expect the cable modem 204 to alter said values. For example, the CMTS 202 may, in response to each probe, generate a new set of pre-equalization parameters which is not dependent upon previously generated pre-equalization parameters, or which depends only upon excluded links (e.g., subcarriers).

According to some embodiments, the pre-equalization vector received from the CMTS 202 can depend on a previously generated pre-equalization vector. For example, the CMTS 202 may not generate pre-equalization parameters for any limited subcarriers, or may otherwise provide an indication or recognition that the CMTS 202 is aware of the limited subcarriers or other adjustments to the pre-equalization parameters.

Referring again to operation 804, and in further detail, the cable modem 204 determines a boost limiting threshold, $TH_3$, which is also referred to as boost. For example, the cable modem 204 can determine $TH_3$ based on a receipt of a message from the BAS system (e.g., from another node of the HFC network such as a modem, CMTS 202, or the like, or from an out-of-band source from other than the HFC network). In some embodiments, the cable modem 204 can determine $TH_3$ locally, such as by determining a $TH_3$ value which does not violate a maximum DRW (e.g., 12 dB, 6 dB, etc.), power spectral density limits, maximum power transmission limits, or the like. In some instances, $TH_3$ can adjust the boost value, rather than define it by a fixed value. The application of such a threshold can generate a dynamic limit, which is generated responsive to a condition of a network including the cable modem 204.

The $TH_3$ threshold can set the amount of power increase probes will provide after the onset of frequency-selective attenuation (e.g., on a per link, per, subcarrier, or per channel basis). As indicated, $TH_3$ may not be determined or employed, in some embodiments, where the transfer function, H(f) is sufficiently flat. In some embodiments, boost calculated as less than $TH_1$ in FIG. 7 may indicate that limiting of the pre-equalization values using $TH_3$ is not indicated, but this may not always be the case; in some cases TH1 and TH3 may be the same, or $TH_3$ less than $TH_1$. That is, in some instance, the various adjustments of the parameters of a pre-equalization vector (e.g., to a scalar indication of transmit power or magnitude) can be made without a further adjustment to the channel power. By limiting E(f) based on $TH_3$, a deficit at the receiver can be limited to so as not to exceed a boost value (e.g., so as not to exceed a particular increase in the cable modem transmit power due to the non-flat frequency response of the channel). The cable modem 204 may, corresponding to an increase in transmit power based on $TH_3$, adjust the DRW upward and adjust other channels downward, with the downward adjustment of other channels occurring if the total composite power of the cable modem 204 cannot accommodate the increase in channel power of the impaired channel without such a compensation in one or more of the other channels. Such adjustments can maintain or reduce a power spectral density, or overall power employed by the cable modem transmitter. The cable modem 204 may determine the DRW based on various links thereof, or based on links associated with other devices of the HFC network. The cable modem 204 can receive such information from any device of the BAS. The cable modem 204 can determine such adjustments locally based on adjustment values received from a BAS. The adjustments can differ from an adjustment received from the CMTS 202, or can be made in an absence of a receipt of a command of an adjustment from the CMTS 202.

Referring again to operation 806, and in further detail, the cable modem 204 can calculate boost (average of S(fn) or S(fn)"). For example, the cable modem 204 can calculate boost according to the disclosure of operation 704, or elsewhere (e.g., operation 410) as described herein. At operation 808, the boost (calculated from S(fn)) is compared to $TH_3$, whereupon the cable modem 204 can set a temporary flag (T_flag) indicating that a pre-equalization vector applied to a transceiver of the cable modem 204 may vary from the pre-equalization vector received from the CMTS 202 and stored at operation 802, at operation 810.

At operation 812, the cable modem 204 determines an upper limit for the transfer function comprising the frequency response, H(f), for each link (non-excluded subcarrier) of the modem in the subject OFDMA channel. Such a limited value can be termed as H(f)', comprising $H(f_n)'$ for each link (subcarrier) from 1 to n. For example, H(f)' can be defined, at operation 812A, as:

$$\text{MAX}\left\{|H(f_n)|, \frac{\text{MAX}}{TH_2^2}\right\}$$

In some embodiments, the cable modem 204 can omit, substitute, or modify various operations, such as operation 812A. For the purposes of this disclosure, the H(f) subsequent to operation 812 will be referred to as H(f)' regardless of whether such limiting takes place. Put differently, at 812B, the cable modem 204 can apply an undefined (e.g., infinite) threshold, such that H(f)=H(f)'.

Referring again to operation 814, and in further detail, the cable modem 204 can determine a further limit the transfer function. Particularly, the boost can be limited on a subcarrier basis, wherein the $TH_3$ of limited subcarriers threshold is allocated according to a number of total non-excluded subcarriers. For example, where a $TH_3$ value of 1 dB is provided, and 10% of non-excluded subcarriers are limited by the $TH_3$ value, boost for the non-excluded subcarriers ($TH_4$) can be 1 dB/10%=4.1 dB. $TH_4$ can be found such that the resulting S(fn)" averages to boost" (e.g., summation from 1 to n of (S(fn)")/n will equal boost" which will be $TH_3$, if the average of S(fn)' exceeds $TH_3$). It follows than n(boost")=summation from 1 to N of (S(fn)"). For each m from 1 to m, (S(fn)") can be ordered where a smallest (S($f_m$)") is defined as (S($f_{m1}$)"), and a largest as (S($f_m$)"). A sum can be defined, $Ssum_k$=sum of S($f_m$)" from 1 to K. $TH_{4k}$ can be defined as ((N(boost")−$Ssum_k$)/(N−K)). A largest value of K can be selected such that S($f_k$)"<$TH_{4k}$, and $TH_4$ can be defined by $TH_{4k}$, which can correspond to a maximum limiting value employed according to some implementations. That is, the most attenuated subcarriers (e.g., attenuated by the HFC plant) can be limited in a power adjustment.

The method 800 is not intended to be limiting; various omissions, substitutions, or additions can be present in various embodiments. For example, in some embodiments, subcarriers with limited pre-equalization values are further examined, and if the pre-equalization value has been limited by more than set amount, e.g., S(fn)"/S(fn) exceeds another threshold, $TH_{short}$, these subcarriers can be excluded from transmission altogether. This can provide that a remaining transmit power for the channel can be allocated to the other transmitted subcarriers, so that $TH_4$ can be recalculated to set the remaining transmitted subcarriers to have average S(fn)''' equal to $TH_3$.

In some embodiments, all minislots that contain subcarriers with limited pre-equalizer values can correspond to the property that each subcarrier in any minislot has the same shortfall as all the other subcarriers in the minislot. An operation can be performed prior to the operation of eliminating or excluding subcarriers from transmission that have too large a shortfall, so the newly created values will be S(fn)''' derived from the S(fn)" of the method 800 of FIG. 8. To realize the same shortfall for every subcarrier in a minislot which contains one or more shortfall subcarriers, another vector, S(fn)''' can be defined. The following two equations can describe, for each minislot, i, which contains at least one subcarrier that has a limited pre-equalization value:

Shortfall(fn)i=S(fn)'''/S(fn)=same value for each subcarrier in minislot m=X=>S(fn)'''=XS(fn)

Transmit power of minislot m=sum of S(fn)" over all subcarriers in minislot m=$P_m$ And then we require, sum of S(fn)''' over all subcarriers in minislot m still=$P_m$ Sum of S(fn)'''=sum of {X times S(fn)}=X times sum of S(fn)=$P_m$ So, X=Pm/{sum of S(fn)} of all subcarriers in minislot m Thus, pre-equalization values for subcarriers in minislots which contain at least one subcarrier which has a limited pre-equalization value can be determined. Methods performed according to the present disclosure can include checking if any minislots have a shortfall which is indicative of exclusion (e.g., by comparison to a predefined or variable threshold). The available channel power may be re-distributed to some of the limited minislots allowing the repeat of the process in FIG. 8, but with (more) excluded subcarriers, and this may result in an increase of $TH_4$ compared to the first operation of the algorithm in FIG. 8.

At operation 816, the cable modem 204 can determine an adjusted pre-equalization vector, defined according to the inverse of the frequency response magnitude, above, (e.g., $E(f_n)''=1/H(f_n)''$). With continued reference to operation 816, the cable modem 204 can equalize the adjusted pre-equalization vector to normalize power (e.g., magnitude squared) to unity (or towards unity). At operation 820, the cable modem 204 can determine DRW and a transmit power for the various links, as discussed above, with respect to operation 710, and further including evaluating permanent or temporary flags actuated throughout the present method 800. The temporary flags may thereafter be latched into the permanent flags at operation 822 (e.g., by registers, memory, or the like) and the temporary flags can be cleared. Thus, for subsequent iterations of the present method 800, the cable modem 204 or other connected devices can discriminate between a present indication and a past indication associated with the flags.

At operation 824, the cable modem 204 can store values locally or over the BAS, or otherwise convey values to another BAS device. For example, the cable modem 204 can convey indices of limited sub-carriers, non-limited subcarriers, flag states, etc. Thereafter, the method 800 may return to operation 802, such as upon a receipt of further transfer function data from the CMTS 202. The operations described herein are not intended to be limiting. The various operations disclosed herein can be omitted, added, substituted, or so forth. For example, in some embodiments, the method 800 can include an operation to generate of notification of information to a user interface, or accumulating state data to determine further operations based thereupon. The method 800 can generate sequential data for any number of subsequent indications of states of flags, signal levels, or so forth. Some actions can be taken responsive to a threshold number of cycles. For example, a subcarrier can be excluded responsive to a predefined number of flags associated with the subcarrier (e.g., an indication of attenuation for a threshold number of probe responses).

Figure 9:
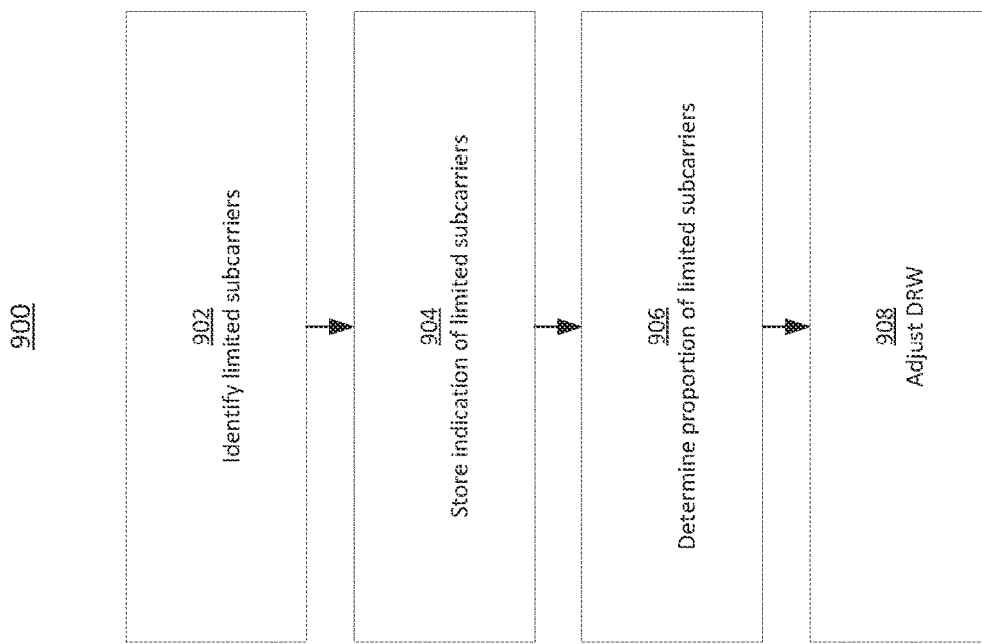
FIG. 9 depicts a flow diagram of yet another method, according to some embodiments.

Referring now to FIG. 9, a flow diagram of another method 900 is provided, according to an illustrative embodiment. In brief summary, at operation 902, limited subcarriers are identified. At operation 904, an indication of the limited number of subcarriers is stored. At operation 906, a proportion of limited subcarriers is determined. At operation 908, a DRW is adjusted, based on the proportion of limited subcarriers.

Referring again to operation 902, a quantity of limited subcarriers is determined for a channel. The limited subcarrier can refer to subcarriers for which a normalization or equalization value exceeds a threshold. For example, the threshold can correspond to a maximum output of an emitter, a power of a specification, boost, or a variant thereof as provided by the present disclosure, or a predefined or dynamic threshold (e.g., $TH_1$, $TH_2$, $TH_3$, $TH_4$, or $TH_{short}$).

Referring again to operation 904, an indication of the limited number of subcarriers is stored. The indication can include one or more flags. For example, operation 904 can include setting a flag if any subcarrier is limited. In some embodiments, multiple flags can be set according to one or more limits. For example, one flag can be set responsive to an indication that a subcarrier is limited relative to $TH_3$, and another flag can be set responsive to an indication that a subcarrier is limited relative to $TH_4$.

Referring again to operation 906, a proportion of limited subcarriers is determined. For example, the proportion of limited subcarrier can be determined by comparing a number of limited subcarriers of a channel to a total number of subcarriers of the channel, or a non-excluded number of subcarriers of the channel. Determining the proportion can include determining the proportion relative to one or more thresholds (e.g., comparing the proportion to the threshold). For example, one or more thresholds can correspond to a substantial number of limited subcarriers (e.g., twenty percent, sixty percent, or so forth). The one or more comparisons may be stored, such as by setting or clearing a flag.

Referring again to operation 908, a DRW is adjusted, based on the proportion of limited subcarriers. For example, the DRW can be adjusted based on a current number of limited subcarriers or a number of limited subcarriers associated with one or more messages (e.g., probe response). A change to the DRW can be based on one or more flags or other memory effects. For example, the DRW can be changed based on an offset (e.g., 3 dB), wherein the DRW is selected to be equal to or lesser than a lowest DRW for a non-impaired channel. That is, the DRW can be selected such that the DRW does not raise a DRW window for other channels. Thus, a substantially impaired channel (e.g., as determined by a proportion of affected subcarriers at operation 906, which may be indicative of, for example, resonant peaking) may not result in increased power density adjacent to other channels, or such an increase in power may be limited by the offset (e.g., 3 dB).

Figure 10:
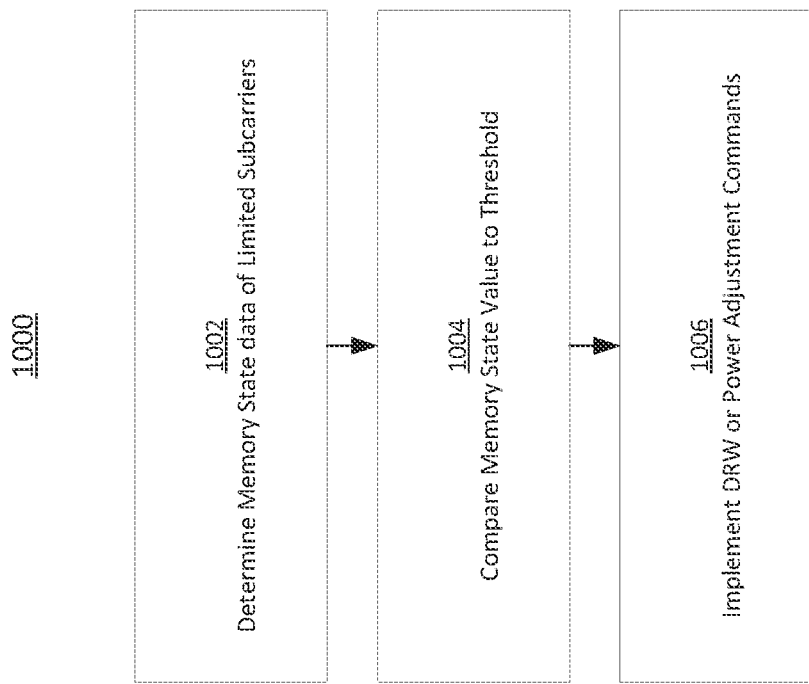
FIG. 10 depicts a flow diagram of a further method still, according to some embodiments.

Referring now to FIG. 10, a flow diagram of another method 1000 is provided, according to an illustrative embodiment. In brief summary, at operation 1002, memory state data for of limited subcarriers is determined. At operation 1004, the memory state is compared to a threshold. At operation 1006, a device can implement DRW or power adjustment commands, based on the comparison.

Referring again to operation 1002, memory state data for of limited subcarriers is determined. The memory state data can be determined by establishment of various flags, vectors, or other information associated with a limited subcarrier. For example, the memory state data can be received with respect to a current and prior probe/probe response pair, or another flag, such as another flag of the method 700 of FIG. 7, the method 800 of FIG. 8, or the method 900 of FIG. 9.

Referring again to operation 1004, the memory state is compared to a threshold. The comparison can be based on one more states, or a state from two or more iterations. For example, the comparison can include a ratio of an intersection between subcarriers of a previous and current update (e.g., subcarriers which have not resolved a limiting condition, such as attenuation). For example, if a channel including 1200 subcarriers has 900 limited subcarriers in a prior update (e.g., a prior series of operations based on information from a prior probe response), and 1140 limited subcarriers in a prior update (e.g., a prior series of operations based on information from a most recent probe response), the minimum of the memory state (e.g. 0.75), average (e.g., 0.85) maximum, (e.g., 0.95), or other aspect can be compared to a predefined threshold.

In some embodiments, the comparison can further include trend line or other information. For example, an improving ratio (e.g., reduced number of limited subchannels), such as from 1140 limited subcarriers to 900 limited subcarriers can be associated with a different action that a degrading or stable channel. Responsive to a determination that the channel health meets the threshold (e.g., includes a fewer number of limited subchannels), the system can continue to operate according to a locally commanded boost command. Responsive to a determination that the channel health does not meet the threshold, the method 900 can proceed to operation 1006.

Referring again to operation 1006, a device, such as a cable modem can follow received DRW or power adjustment implement commands (e.g., from a CMTS). In some embodiments, the method 900 can include providing an indication of link degradation, for presentation to a user (e.g., via a notification). In some embodiments, the method 900 can include limiting a channel power, bit rate, or other attribute.

Various descriptions, herein, make use of the word "or" to refer to a plurality alternative options. Such references are intended to convey an inclusive or. For example, a reference to the CMTS 202 or cable modem 204 can refer to only the CMTS 202, only the cable modem 204, both the CMTS 202 and the cable modem 204, or the CMTS 202 in combination with the cable modem 204.

It should be noted that certain passages of this disclosure can reference terms such as "first" and "second" in connection with subsets of frames, response, and devices, for purposes of identifying or differentiating one from another or from others. These terms are not intended to relate entities (e.g., a first device and a second device) temporally or according to a sequence, although in some cases, these entities can include such a relationship. Nor do these terms limit the number of possible entities (e.g., CMTS, modems, or other network nodes) that can operate within a system or environment. It should be understood that the systems described above can provide multiple ones of any or each of those components and these components can be provided on either a standalone machine or, in some embodiments, on multiple machines in a distributed system. Further still, bit field positions can be changed and multibit words can be used. In addition, the systems and methods described above can be provided as one or more computer-readable programs or executable instructions embodied on or in one or more articles of manufacture, e.g., a floppy disk, a hard disk, a CD-ROM, a flash memory card, a PROM, a RAM, a ROM, or a magnetic tape. The programs can be implemented in any programming language, such as LISP, PERL, C, C++, C#, or in any byte code language such as JAVA. The software programs or executable instructions can be stored on or in one or more articles of manufacture as object code. Circuitry may refer to any electronic circuits or circuits.

The term "coupled" and variations thereof includes the joining of two members directly or indirectly to one another. The term "electrically coupled" and variations thereof includes the joining of two members directly or indirectly to one another through conductive materials (e.g., metal or copper traces). Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical (e.g., magnetic), or fluidic.

While the foregoing written description of the methods and systems enables one of ordinary skill to make and use embodiments thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

What is claimed is:

1. A system comprising:
a circuit configured to:
receive, at a first input, a first message from a device over a channel, the channel comprising a plurality of subcarriers;
determine a transfer function associated with each of the plurality of subcarriers, the transfer function comprising an indication of power transfer between the circuit and the device;
determine, using the transfer functions, a plurality of first power adjustments configured to cause a receipt, at the device, of an equal power level for each subcarrier of the plurality of subcarriers;
determine, using the plurality of first power adjustments, a second power adjustment configured to provide a channel power equal to a predefined power level for the channel; and
transmit, at a first output, a second message over the channel, the transmit power of the second message responsive to the plurality of first power adjustments and the second power adjustment.

2. The system of claim 1, wherein the first message is a probe response, the probe response generated responsive to an output by the circuit comprising a probe.

3. The system of claim 1, wherein the second power adjustment is based on a summation of an indication of a received amplitude for each of the plurality of subcarriers divided by a quantity of the plurality of subcarriers, the indication of the received amplitude based on a square of a ratio of a largest transfer function to each transfer function.

4. The system of claim 3, wherein the circuit is configured to:
compare a predefined threshold to the indication of the received amplitude to determine a quantity of subcarriers of the plurality of subcarriers exceeding the predefined threshold; and
determine a second threshold which is equal to the predefined threshold scaled according to a ratio of:
the quantity of the plurality of subcarriers to the quantity of subcarriers of the plurality of subcarriers exceeding the predefined threshold,
wherein the plurality of first power adjustments, for the subcarriers of the plurality of subcarriers exceeding the predefined threshold, are based on the second threshold.

5. The system of claim 1, wherein the circuit is configured to:
identify a first set of a second plurality of subcarriers as excludable; and
identify a second set of the second plurality of subcarriers as non-excludable, wherein the plurality of subcarriers consist of the second set.

6. The system of claim 1, wherein each transfer function comprises a scalar indicating a subcarrier power, normalized relative to other subcarriers of the plurality of subcarriers.

7. The system of claim 1, wherein the system is configured to generate a notification indicating a condition of the channel for presentation via a user interface.

8. The system of claim 1, wherein the system comprises a cable modem, the cable modem comprising the circuit.

9. The system of claim 8, wherein the second power adjustment is determined responsive to a power adjustment command received from a broadband access server (BAS).

10. The system of claim 8, wherein the second power adjustment varies from a current power adjustment received from a cable modem termination service (CMTS).

11. The system of claim 1, comprising the system to:
determine a portion of the second power adjustment according to a predefined offset;
determine a set of subcarriers of the plurality of subcarriers having a power level corresponding to the portion; and
exclude the set of subcarriers.

12. A method, comprising:
receiving, by a first device, a first message from a second device over a channel, the channel comprising a plurality of subcarriers;
determining, by the first device, a transfer function associated with each of the plurality of subcarriers, the transfer function comprising an indication of power transfer between the first device and the second device;
determining, using the transfer functions, a plurality of first power adjustments corresponding to the plurality of subcarriers;
determining, using the plurality of first power adjustments, a second power adjustment for the channel, the second power adjustment based on a summation of an indication of a received amplitude for each of the plurality of subcarriers divided by a quantity of the plurality of subcarriers, the indication of the received amplitude based on a square of a ratio of a largest transfer function to each transfer function; and
transmitting, by the first device, a second message over the channel, the transmit power of the second message responsive to the plurality of first power adjustments and the second power adjustment.

13. The method of claim 12, wherein:
the plurality of first power adjustments are configured reduce a power level deviation between two or more of the plurality of subcarriers; and
the second power adjustment is configured to provide a channel power equal to a predefined power level.

14. The method of claim 12, wherein the first message is a probe response.

15. The method of claim 14, further comprising:
comparing a predefined threshold to the indication of the received amplitude to determine a quantity of subcarriers of the plurality of subcarriers exceeding the predefined threshold; and determining a second threshold which is equal to the predefined threshold scaled according to a ratio of:
the quantity of the plurality of subcarriers to the quantity of subcarriers of the plurality of subcarriers exceeding the predefined threshold,
wherein the plurality of first power adjustments, for the subcarriers of the plurality of subcarriers exceeding the predefined threshold, are based on the second threshold.

16. The method of claim 15, comprising:
generating a notification indicating a condition of the channel for presentation via a user interface.

17. A device configured to:
receive a first message from a second device over a channel, the channel comprising a plurality of subcarriers;
determine, a transfer function associated with each of the plurality of subcarriers, the transfer function comprising an indication of power transfer with the second device;
determine, using the transfer functions, a plurality of first power adjustments corresponding to the plurality of subcarriers;
determine, using the plurality of first power adjustments, a second power adjustment for the channel, based on a summation of an indication of a received amplitude for each of the plurality of subcarriers divided by a quantity of the plurality of subcarriers, the indication of the received amplitude based on a square of a ratio of a largest transfer function to each transfer function; and
transmit a second message over the channel, the transmit power of the second message responsive to the plurality of first power adjustments and the second power adjustment.

18. The device of claim 17, wherein:
the plurality of first power adjustments are configured to cause a receipt, at the second device, of an equal power level for each subcarrier of the plurality of subcarriers; and
the second power adjustment is configured to provide a channel power equal to a predefined power level.

19. The device of claim 17, wherein the device is configured to:
compare a predefined threshold to the indication of the received amplitude to determine a quantity of subcarriers of the plurality of subcarriers exceeding the predefined threshold; and determine a second threshold which is equal to the predefined threshold scaled according to a ratio of:
the quantity of the plurality of subcarriers to the quantity of subcarriers of the plurality of subcarriers exceeding the predefined threshold,
wherein the plurality of first power adjustments, for the subcarriers of the plurality of subcarriers exceeding the predefined threshold, are based on the second threshold.

20. A system comprising:
a circuit configured to:
receive, at a first input, a first message from a device over a channel, the channel comprising a plurality of subcarriers;
determine, for each of the plurality of subcarriers, a transfer function comprising an indication of power transfer between the circuit and the device, the transfer function comprising a scalar indicating a subcarrier power normalized relative to other subcarriers of the plurality of subcarriers;
determine, using the transfer functions, a plurality of first power adjustments corresponding to the plurality of subcarriers;
determine, using the plurality of first power adjustments, a second power adjustment for the channel; and
transmit, at a first output, a second message over the channel, the transmit power of the second message responsive to the plurality of first power adjustments and the second power adjustment.

21. A system comprising:
a circuit configured to:
   receive, at a first input, a first message from a device over a channel, the channel comprising a plurality of subcarriers;
   determine a transfer function associated with each of the plurality of subcarriers, the transfer function comprising an indication of power transfer between the circuit and the device;
   determine, using the transfer functions, a plurality of first power adjustments corresponding to the plurality of subcarriers;
   determine, using the plurality of first power adjustments, a second power adjustment for the channel;
   transmit, at a first output, a second message over the channel, the transmit power of the second message responsive to the plurality of first power adjustments and the second power adjustment; and
   generate a notification indicating a condition of the channel for presentation via a user interface.

22. A system comprising:
a cable modem including a circuit configured to:
receive, at a first input, a first message from a device over a channel, the channel comprising a plurality of subcarriers;
determine a transfer function associated with each of the plurality of subcarriers, the transfer function comprising an indication of power transfer between the circuit and the device;
determine, using the transfer functions, a plurality of first power adjustments corresponding to the plurality of subcarriers;
determine, using the plurality of first power adjustments, a second power adjustment for the channel; and
transmit, at a first output, a second message over the channel, the transmit power of the second message responsive to the plurality of first power adjustments and the second power adjustment.

23. A system comprising:
a circuit configured to:
receive, at a first input, a first message from a device over a channel, the channel comprising a plurality of subcarriers;
determine a transfer function associated with each of the plurality of subcarriers, the transfer function comprising an indication of power transfer between the circuit and the device;
determine, using the transfer functions, a plurality of first power adjustments corresponding to the plurality of subcarriers;
determine, using the plurality of first power adjustments, a second power adjustment for the channel based on a summation of an indication of a received amplitude for each of the plurality of subcarriers divided by a quantity of the plurality of subcarriers, the indication of the received amplitude based on a square of a ratio of a largest transfer function to each transfer function; and
transmit, at a first output, a second message over the channel, the transmit power of the second message responsive to the plurality of first power adjustments and the second power adjustment.

24. A system comprising:
a circuit configured to:
receive, at a first input, a first message from a device over a channel, the channel comprising a plurality of subcarriers;
identify one or more excludable subcarriers from the plurality of subcarriers;
identify a plurality of non-excludable subcarriers from the plurality of subcarriers;
determine a transfer function associated with each of the plurality of non-excludable subcarriers, the transfer function comprising an indication of power transfer between the circuit and the device;
determine, using the transfer functions, a plurality of first power adjustments corresponding to the plurality of non-excludable subcarriers;
determine, using the plurality of first power adjustments, a second power adjustment for the channel; and
transmit, at a first output, a second message over the channel, the transmit power of the second message responsive to the plurality of first power adjustments and the second power adjustment.

* * * * *